United States Patent
Sathyanarayana Rao et al.

(10) Patent No.: US 11,659,362 B1
(45) Date of Patent: May 23, 2023

(54) MANAGING COMMUNICATIONS SESSIONS BASED ON RESTRICTIONS AND PERMISSIONS

(71) Applicant: Amazon Technologies, Inc., Seattle, WA (US)

(72) Inventors: Shambhavi Sathyanarayana Rao, Seattle, WA (US); Patrick Fiori, Seattle, WA (US); Ford Davidson, Bellevue, WA (US); Rohit Lohani, Sammamish, WA (US); Shawn Michael Banks, Issaquah, WA (US); Merle Michael Robinson, Kirkland, WA (US); Ninad Parkhi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 17/074,264

(22) Filed: Oct. 19, 2020

Related U.S. Application Data

(63) Continuation of application No. 16/454,614, filed on Jun. 27, 2019, now Pat. No. 10,841,756.

(51) Int. Cl.
*H04W 4/00* (2018.01)
*H04W 4/16* (2009.01)
*H04L 67/148* (2022.01)
*H04M 1/72484* (2021.01)
*H04L 67/303* (2022.01)
*H04M 3/58* (2006.01)
*H04L 61/4594* (2022.01)

(52) U.S. Cl.
CPC ............ *H04W 4/16* (2013.01); *H04L 61/4594* (2022.05); *H04L 67/148* (2013.01); *H04L 67/303* (2013.01); *H04M 1/72484* (2021.01); *H04M 3/58* (2013.01)

(58) Field of Classification Search
CPC ..... H04W 4/16; H04M 1/72484; H04M 3/58; H04L 61/4594; H04L 67/148; H04L 67/303
See application file for complete search history.

(56) References Cited

U.S. PATENT DOCUMENTS 11,393,451 B1 * 7/2022 Srinivasan .............. G10L 15/22
2002/0167946 A1 11/2002 Gallant
(Continued)

OTHER PUBLICATIONS

U.S. Appl. No. 16/454,614, "Non-Final Office Action," dated Mar. 17, 2020, 10 pages.
(Continued)

*Primary Examiner* — Khai M Nguyen
(74) *Attorney, Agent, or Firm* — Pierce Atwood LLP

(57) ABSTRACT

Techniques related to managing data communications between devices are described. In an example, a computer system receives, from a first device, a request to transfer a communications session with the first device and a second device. The computer system determines contextual data associated with the communications session. Using at least the contextual data, the computer system determines the communications session is permitted to be transferred from the first device to a third device based. The computer system causes a transferred communications session to be established with the third device and the second device.

18 Claims, 22 Drawing Sheets

(56) References Cited

U.S. PATENT DOCUMENTS

| | | | |
|---|---|---|---|
| 2005/0079858 A1* | 4/2005 | Rosen | H04W 48/02 |
| | | | 455/414.1 |
| 2006/0046757 A1 | 3/2006 | Hoover et al. | |
| 2017/0083285 A1* | 3/2017 | Meyers | G10L 15/00 |
| 2018/0102992 A1 | 4/2018 | Pysanets et al. | |
| 2018/0343309 A1* | 11/2018 | Mishra | H04L 63/0861 |

OTHER PUBLICATIONS

U.S. Appl. No. 16/454,614, "Notice of Allowance," dated Jul. 15, 2020, 11 pages.

\* cited by examiner

MANAGING COMMUNICATIONS SESSIONS BASED ON RESTRICTIONS AND PERMISSIONS

CROSS-REFERENCE TO RELATED APPLICATIONS

This application claims priority to and is a continuation of U.S. application Ser. No. 16/454,614, filed Jun. 27, 2019, and titled "MANAGING COMMUNICATIONS SESSIONS BASED ON RESTRICTIONS AND PERMISSIONS," the content of which is herein incorporated in its entirety for all purposes.

BACKGROUND

As voice recognition technology improves, systems that employ such technology continue to proliferate. Some systems employ what is referred to as near-field voice recognition where a user speaks into a microphone located on a hand-held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio and video communications with other devices.

BRIEF DESCRIPTION OF THE DRAWINGS

Various embodiments in accordance with the present disclosure will be described with reference to the drawings, in which.

DETAILED DESCRIPTION

Figure 1:
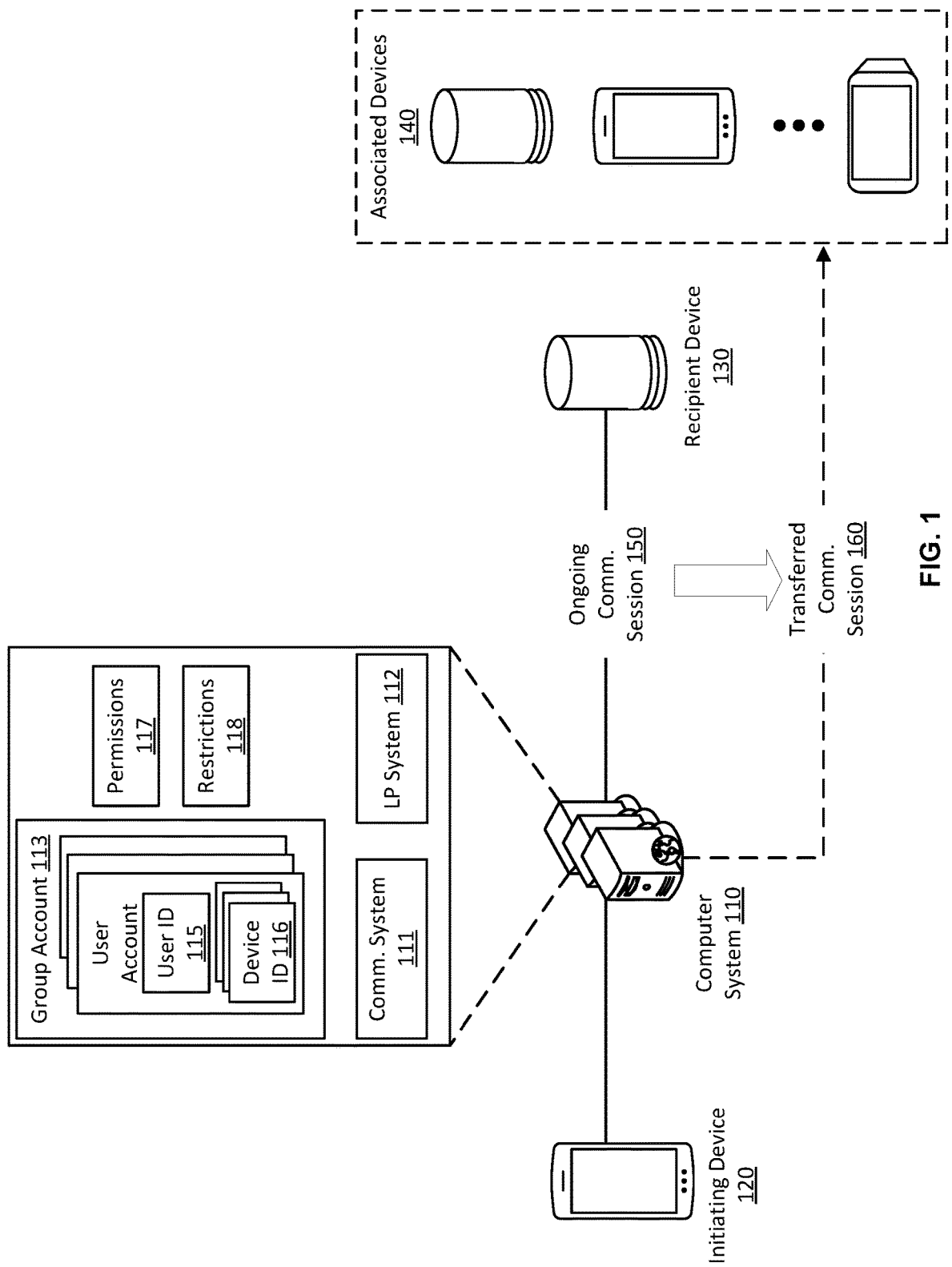
FIG. 1 illustrates an example system for data communications between devices based on permissions restrictions, according to certain embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to managing communications session that include devices. In an example, an ongoing communications session that includes a set of devices is transferred to a different set of devices according to permissions and restrictions. For instance, a computer system establishes a communications session between a first device and a second device based on a request for the communications session. The computer system determines contextual data associated with the communications session, such as an address of record, user identifiers involved in the communications session, user requests received during the communication session, locations of devices, contacts lists associated with user identifiers, and/or list of permitted contacts associated with the user identifiers. Based on the contextual data, the computer system generates permission and restriction data indicating whether transferring the communications session from the first device to one or more other devices is permitted or not. Upon a request from the first device to transfer the communications session, the computer system determines a third device to which the transfer permitted transfers the communications session to the third device such that, upon the transfer, the communications session includes the third device and the second device. Additionally or alternatively, the computer system sends notification data to the third device indicating that requesting the data communications transfer is permitted. Upon a request from the third device, the computer system transfers the communications session to the third device.

To illustrate, consider a first example of a user (Alice) operating a mobile phone to call a contact named John. The computer system receives a call request from the mobile phone and determines that two devices are registered under John's user account. The first device is a smart speaker hosting a call application. The second device is a mobile phone also hosting the call application. The computer system instructs both of John's devices to ring and receives a call acceptance from the smart speaker. The computer system establishes a communications session between Alice's mobile phone and John's smart speaker. Given that the call request identified John, the computer system also sets a permission to allow the call to be transferred to John's mobile phone and sends a notification to John's mobile phone about the option to transfer the call. Accordingly, John can utter a transfer request at the smart speaker (e.g., "Alexa, move my call to my phone") or input this transfer request via the GUI on their mobile phone. In both cases, the computer system receives the transfer request from John's smart speaker or mobile phone, as applicable, establishes a communications session with Alice's mobile phone and John's phone and terminates the communications session with Alice's mobile phone and John's smart speaker.

In another illustration example, John's user account is associated with a group account (e.g., "home") that also includes a user account for another user named Robert. Robert's user account indicates that the smart speaker and another mobile device are available to Robert. In this example, the computer system receives a generic call request associated with the group account from Alice's mobile phone (e.g., Alice calling "home" rather than "John" or "Robert"). The computer system instructs all three devices (the smart speaker and each of John's and Robert's mobile phone) to ring. Upon receiving a call acceptance from the smart speaker, the computer system establishes a communications session with Alice's mobile phone and the smart speaker. Given that call request was to the group account, the computer system generates a permission allowing the call to be transferred to either one of John's mobile and Robert's mobile phone. The computer system also receives audio transmitted from the smart speaker (e.g., directed to the speech processing system) and can use voice biometric processing to identify a user profile of John. One way or another, the computer system can determine that John is a party to the call. Given that the user identifier is John's, the computer system generates a permission to move the call to John's mobile phone and a restriction to move the call to Robert's mobile phone. This restriction overrides the previous permission applicable to Robert's mobile phone. Accordingly, no notification is sent to Robert's mobile phone about the option to pick up the call. Instead, upon receiving a transfer request from either the smart speaker or John's phone to transfer the call (e.g., "Alexa, move my call to my phone"), the computer system establishes a communications session with Alice's mobile phone and John's phone and terminates the other communications session with Alice's mobile phone and John's smart speaker.

Embodiments of the present disclosure provide many technical advantages over existing communications systems. For example, the permissions and restrictions improve controls over transferring communications session between devices. In addition, by using contextual data associated with an ongoing communications session, the permissions and restrictions are updated over time for many different devices, thereby allowing real-time and scalable controls. These and other technical advantages are further described in and are apparent from the present disclosure.

In the interest of clarity of explanation, various embodiments of the present disclosure are described in connection with managing a call between devices. A call is a type of a synchronous communications session that is established based on a request from at least one initiating device and an acceptance from at least one recipient device, where the request is based on input at the initiating device and the acceptance is based on input at the recipient device. The communications session can transmit audio and/or video data over an internet protocol (IP) network based on one or more communications protocols that include a session initiation protocol (SIP), a real-time transport protocol (RTP), secure real-time transport protocol (SRTP), real-time transport control protocol (RTCP), session description protocol (SDP), and/or other standardized or proprietary communications protocols. However, the embodiments of the present disclosure are not limited as such. Instead, the embodiments similarly apply to any type of communications session, whether synchronous or asynchronous and whether for audio data exchange, video data exchange, and/or any other type of multimedia data exchange. For example, the embodiments similarly apply to transferring a "Drop In" session, as offered by Amazon Alexa communications, from one device to one or more other devices. A Drop In also represents a synchronous communications session that is established based on a request from at least one initiating device and an acceptance from at least one recipient device, where the request is based on input at the initiating device and the acceptance is automated based on present permissions associated with the recipient device. In another example, the embodiments similarly apply to transferring video data between video monitoring devices, where the video data can be streamed in a synchronous communication session or can be transmitted as media segments of a media file in an asynchronous communication session.

FIG. 1 illustrates an example system for data communications between devices based on permissions and restrictions, according to certain embodiments of the present disclosure. As illustrated, a computer system 110 establishes a communications session with an initiating device 120 and a recipient device 130 (the communications session is shown as an "ongoing communications session 150"), where the communications session is used to exchange data between the initiating device 120 and the recipient device 130. The data exchange represents data communications between the initiating device and the recipient device 130, where the data communications occur in the communications session. Multiple devices are associated with the recipient device 130 (shown as "associated devices 140"). For these associated devices 140, the computer system 110 sets permission and restriction data based on contextual data of the ongoing communications session 150 to manage transferring the communications session from the recipient device 120 to any permitted device from the associated devices 140. Transferring the communications session represents modifying the communications session to include the permitted device and, optionally, exclude the recipient device 120 such that the data communications is between the initiating device 120 and the permitted device. Upon the transfer, the permitted device is an endpoint of the communications session.

In an example, the initiating device 120 represents a computing device of a user (e.g., a caller associated with a contacts list), where the computing device includes suitable hardware and software (e.g., one or more processors and one or more memories storing computer-readable instructions) to requesting the data communications and supporting the ongoing communications session 150 (e.g., to place a call). The initiating device 120 can be any of a mobile phone such as a smartphone, a tablet, a laptop, a personal computer, a smart speaker, a smartwatch, a smart appliance, or any other computing device. This computing device is referred to herein as an "initiating" device to indicate that the request for the data communications is sent from the computing device.

Similarly, the recipient device 130 represents a computing device of a user (e.g., a contact on the caller's a contacts list), where the computing device includes suitable hardware and software (e.g., one or more processors and one or more memories storing computer-readable instructions) to accepting a communications request and supporting the ongoing communications session 150 (e.g., to receive a call). The recipient device 130 can be any of a mobile phone such as a smartphone, a tablet, a laptop, a personal computer, a smart speaker, a smartwatch, a smart appliance, or any other computing device. This computing device is referred to herein as a "recipient" device to indicate that the communications request is accepted by the computing device.

The recipient device 130 can support different input modalities, including a graphical user interface (GUI) input modality and a voice user interface (VUI) input modality. In case of a VUI, the recipient device 130 can detect a wakeword (e.g., "Alexa," "hey Siri," "OK Google") and send audio data that represents the utterance to the computer system 110. Based on automatic speech recognition (ASR) processing to the audio data and natural language understanding (NLU) processing by the computer system 110, the recipient device 130 can receive data from the computer system 110 about the user utterance, including, for instance, instructions to establish the ongoing communications session 150, instructions to terminate the ongoing communications session 150, and other instructions related to managing the data communications as further described in the present disclosure.

Figure 3:
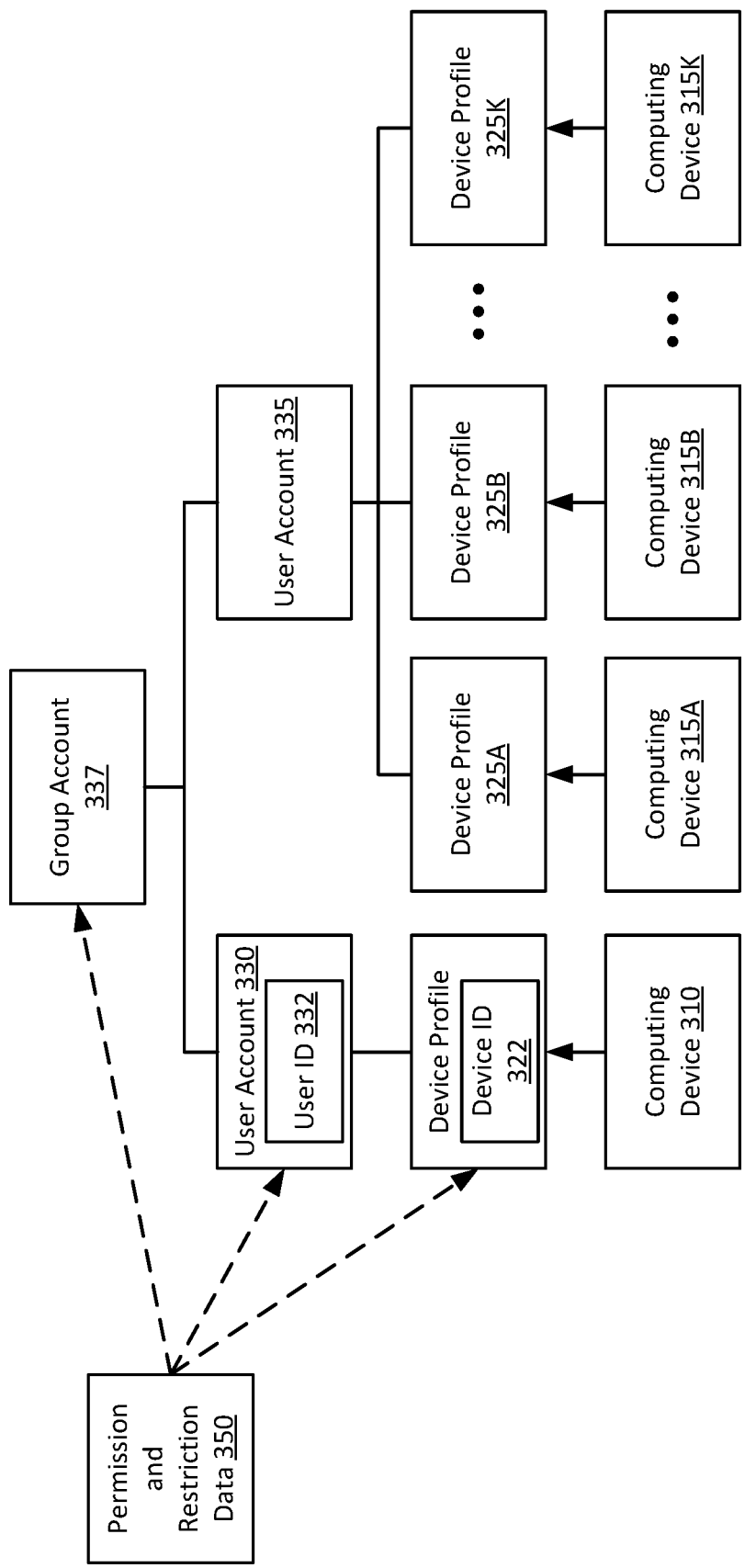
FIG. 3 illustrates example permission and restriction data for multiple computing devices associated with a group account, according to certain embodiments of the present disclosure.

The associated devices 140 can also be computing devices similar to the initiating device 120 and the recipient device 130. Generally, an associated device represents a computing device that is associated with the recipient device 130 and/or the initiating device 120. Various types of associations are possible. In an example, an account association is used. For instance, a computing device is associated with the recipient device 130 when this computing device is registered under a same user account as the one of the recipient device's 130 user or under a group account that includes this user account. FIG. 3 further illustrates this example of association.

The computer system 110 represents a set of computer servers or cloud services running on computer server, where a computer server includes suitable hardware and software (e.g., one or more processors and one or more memories storing computer-readable instructions) to manage the data communications between computing devices. In an example, the computer system 110 includes a communications system 111 and a language processing system 112. The communications system 111 manages communications sessions between the computing devices. The language processing system 112 receives audio data from any one of such computing devices and performs ASR and NLU processing. An output of this processing can be used by the communication system 111 in the management of the communications sessions.

As illustrated, the computer system 110 also stores a group account 113. The group account 113 associates multiple user accounts 114 together. Each account (e.g., group account or user account) represents a data structure that stores information about the account and, optionally, about other accounts. For instance, the group account stores information about a group (e.g., a group identifier, device identifiers, settings applicable to multiple user accounts, etc.) and associations with user accounts. A user account stores information about a user (e.g., a user identifier, device identifiers of devices available to the user, settings applicable to the devices, etc.) A user identifier can a unique string (e.g., a randomly generated string or a string associated with audio fingerprint data, facial data, biometric data, and/or any other data that identifies the user. Such identifiers can be generated and stored according to permissions of the user. A device identifier of a device can be a unique string (e.g., a serial number), a network address (e.g., a media access control address (MAC) address, an internet protocol (IP) address), and/or any identifier of the device, where such identifiers can be generated and stored according to permissions of the user. Of course, the computer system 110 can store multiple group accounts and/or a user account that does not belong to a group account.

In addition, the computer system 110 can generate and store permissions 117 and restrictions 118. A permission represents permission data indicating that transferring an ongoing communications session from one computing device to an associated computing device is permitted. Conversely, a restriction represents restriction data indicating that transferring an ongoing communications session from one computing device to an associated computing device is restricted (e.g., prohibited). In an example, permission and restriction data can be stored as a flag, where one value (e.g., a "1") indicates a permission and another value (e.g., a "0") indicates a restriction).

In an example, the recipient device 130 and the associated devices 140 are associated by one or more user accounts 114 that, in turn, are associated by the group account 113. Based on the contextual data of the ongoing communications session 150, the computer system 110 (e.g., the communications system 111) generates the permissions 117 and restrictions 118 for the associated devices 140. Upon a request to transfer the data communications to a permitted device (e.g., one of the associated devices 140 indicated as being permitted to receive the data communications), the communications system 111 transfers the ongoing communications session 150 to the permitted device (upon the transfer, the communications session is shown as a "transferred communications session 160"). A request to transfer the data communications to a device represents a request to transfer the communications session such that the device is an endpoint of the communications session. Upon this transfer, the transferred communications session 160 is between the initiating device 120 and the permitted device.

Different techniques are possible to transfer the ongoing communications session 150, and cause the transferred communications session 160 to be established with the permitted device and the initiating device 120. Generally, transferring the ongoing communications session 150 includes modifying the ongoing communications session 150 (and, thereby generating the transferred communications session 160) such that the permitted device is an endpoint of the transferred communications session 160. The recipient device 130 can, but need not, remain an endpoint in the transferred communications session 160. In one example technique, the ongoing communications session 150 has a session identifier. The transfer includes generating the transferred communications session 160 as a new communications session with the initiating device 120 and the permitted device and terminating the ongoing communications session 150, where the new communications session also has the session identifier. Accordingly, upon completion of the transfer, data is exchanged between the initiating device 120 and the permitted device but not with the recipient device 130. In another example technique, the ongoing communications session 150 is not terminated. Instead, the recipient device 130 acts a data relay, where data sent from the initiating device 120 in the ongoing communications session 150 is forwarded to the permitted device via the recipient device 130, and where data sent from the permitted device is forwarded to the initiating device 120 via the recipient device 130 in the ongoing communications session 150. The transferred communications session 160 includes the ongoing communications session 150 and the connection between the recipient device 130 and the permitted device in which the data is exchanged between the recipient device 130 and the permitted device. In yet another example, the computer system 110 includes a communications hub. The ongoing communications session 150 includes a first communications session with the initiating device 120 and the communications hub and a second communications session with the communications hub and the recipient device 130. In this example, the transferred communications session 160 is established by generating a third communications session with the communications hub and the permitted device. The second communications may, but need not, be terminated. As such, the transferred communications session 160 includes at least the first communications session and the third communications session.

In addition, different types of triggers to transfer the data communications are possible. In an example, a transfer request is a trigger. The transfer request represents a request sent from the recipient device 130 to transfer the data communications and can specifically identify a computing device to transfer the data communications to (e.g., "Alexa, transfer the call to 'Device ABC'), can be generic without identifying such a computing device (e.g., "Alexa, transfer my call), or can identify a space that where one or more computing devices may be located (e.g., Alexa, transfer my call to the Kitchen). The request can include audio data representing a user utterance received by the recipient device 130 after, for instance, detection of a wakeword. The request can also include text data representing a user input at a GUI of the recipient device 130. In another example, a pick up request is a trigger. The pick up request represents a request sent from a computing device of the associated device 140, rather than the recipient device 130, to transfer the data communications to the computing device (e.g., "Alexa, transfer my call to here"). Here also, the request can include audio data and/or text data.

Accordingly, a caller (e.g., Alice) operates the initiating device 120 (e.g., a mobile phone) to call a contact (e.g., John) that operates the recipient device 130 (e.g., a smart speaker). During the call between the mobile phone and the smart speaker, John can utter "Alexa, transfer the call to my phone." The smart speaker sends audio data about this utterance to the computer system 110. In turn, the computer system determines that John's mobile phone (e.g., one of the associated device 140) is permitted to receive the data communications. Accordingly, the computer system 110 establishes a new call between Alice's mobile phone and John's mobile phone and terminates the call to the smart speaker.

Although FIG. 1 illustrates transferring data communications from a recipient device, the embodiments of the present disclosure are not limited as such. Instead, the embodiments similarly apply to transferring data communications from an initiating device. For instance and referring back to the above example call between Alice's mobile phone and John's smart speaker, the computer system 110 can determine that a tablet is registered under Alice's user account and is permitted to transfer the call thereto. Accordingly, the computer system 110 sends a notification to the tablet, including instructions to present a GUI option to pick up the call. Upon receiving a user selection of the GUI option from the table, the computer system 110 establishes a new call between Alice's tablet and John's smart speaker and terminates the call to Alice's mobile phone.

Figure 2:
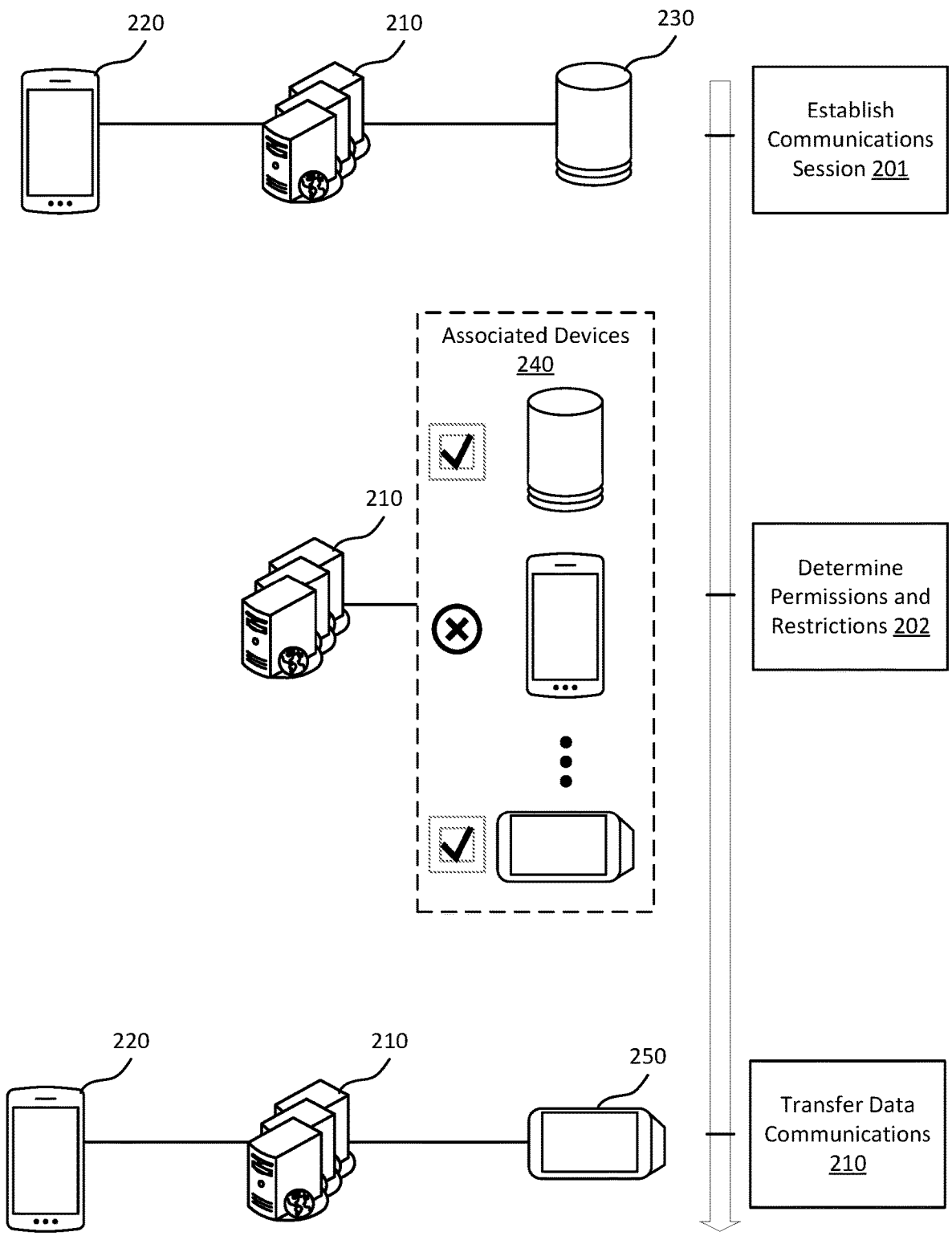
FIG. 2 illustrates example stages for managing data communications based on permissions and restrictions, according to certain embodiments of the present disclosure.

FIG. 2 illustrates example stages for managing data communications based on permissions and restrictions, according to certain embodiments of the present disclosure. In an example a computer system 210 manages data communications between an initiating device 220 and a recipient device 230, where the data communications can be transferred from the recipient device 230 to any, some, or all of associated devices 240. The computer system 210, the initiating device 220, the recipient device 230, and the associated devices 240 are examples of the computer system 110, the initiating device 120, the recipient device 130, and the associated devices 140, respectively, of FIG. 1. As illustrated, managing the data communications can be performed in multiple stages, including a first stage 201 for establishing a communications session between the initiating device 220 and the recipient device 230, a second stage 202 for determining permissions and restrictions applicable to the associated device 240, and a third stage 203 for transferring the data communications from the recipient device 230.

In an example of the first stage 201, the computer system 210 receives a request from the initiating device 220 for data communications. The request corresponds to user input of a caller at the initiating device 230. The request can be sent based on a GUI and/or a VUI of the initiating device 220 and can identify a contact specific to a user account or generic to a group account. If a VUI request is made, a language processing system of the computer system 210 (such as the language processing system 112 of FIG. 1) performs ASR and NLU processing based on the corresponding audio data that is received to determine an intent for a type of the data communications (e.g., an audio call or an audio/video call) and a an address of the data communications (e.g., the contact or an address of record). A communications system of the computer system 210 (such as the communications system 111 of FIG. 1) performs a connection resolution to identify one or more devices of the contact, can send one or more directives to the identified device(s) (including the recipient device 230) to initiate a communications session, receive a response back from the recipient device 230, sets up a secure connection between the initiating device 220 and the recipient device 230, and route the data communications between these devices over the secure channel by using one or voice over IP (VoIP) protocols including, but not limited to SIP, RTP, RTCP, SRTP, and SDP or other communication protocols.

In an example of the second stage 202, the computer system 210 determines contextual data of the ongoing communications session that was established under the first stage 201. Different types of contextual data are possible, including, for instance, the original address of the request (e.g., whether the contact is specific to a user account or to a group account), user identifiers involved in the data communications (e.g., a user identifier associated with the caller and a user identifier associated with the actual contact operating the recipient device 230), user requests received during the communication session (e.g., GUI and/or VUI requests identifying a device or space to which the data communications should be transferred), locations of devices (e.g., including that of the recipient device 230), contacts lists (e.g., including the contacts list of the caller), and/or lists of permitted contacts (e.g., a list of permitted contacts associated with a user account). The computer system 210 generates permission and restriction data from the contextual data based on a set of rules, as further described in the next figures. For each of the associated devices 240, the computer system 210 can indicate whether transferring the data communications to the associated is permitted (e.g., shown in FIG. 2 with a checkmark) or restricted (e.g., shown in FIG. 2 with an X mark).

In an example of the third stage 203, the computer system 210 transfers the data communications from the recipient device 230 to a computing device 250, which is one of the associated devices 240 that were determined to be permitted for the transfer at the second stage 202. Different events are possible to trigger this transfer, including, for instance, a transfer request received from the recipient device 230 or a pick up request received from the computing device 250. As explained herein above, transferring the communications session can include establishing a new communications session between the initiating device 220 and the computing device 250 and terminating the communications session between the initiating device 220 and the recipient device 230. Additionally or alternatively, transferring the communications session can include maintaining the communications session between the initiating device 220 and the recipient device 230 and instructing the recipient device 230 to forward incoming data from the initiating device 220 to the computing device 250 and incoming data from the computing device 250 to the initiating device 220.

FIG. 3 illustrates example permission and restriction data for multiple computing devices associated with a group account, according to certain embodiments of the present disclosure. In an example, multiple computing devices may be associated with a user account corresponding to an individual. Multiple user accounts maybe associated with a same group account. To illustrate, a family may have a group account corresponding to the family (e.g., the group) account is stored with an identifier as "home"), and this group account can associate two user accounts. The first one corresponds to a parent (e.g., the user account is stored with an identifier as "John") and the second one corresponds to a child (e.g., the user account is stored with an identifier as "Robert"). In turn, one or more computing devices may be associated with the parent's user account and one or more computing devices may be associated with the child's user account. Permission and restriction data 350 can be set at the group account level, user account level, or device level.

As illustrated, multiple computing devices 310, 315A, 315B, . . . , 315K are available, each of which has a device profile (e.g., a device profile 320 corresponding to the computing device 310, a device profile 325A corresponding to the computing device 315A, a device profile 325B corresponding to the computing device 315B, . . . , a device profile 325K corresponding to the computing device 315K). Each device profile can include a device identifier (e.g., a device identifier 322 is illustrated in FIG. 3 as being stored in association with the device profile 320 of the computing device 310). The computing device 310 is associated with a first user account 330 and the computing devices 315A, 315B, . . . , 315K are associated with a second user account 335. Each user account can store a user identifier (e.g., a user identifier 332 is illustrated in FIG. 3 as being stored in association with the user account 330 of the first user). The first user account 330 and the second user account 335 are associated with the same group account 337. Of course other variations are possible, where for instance, more than one device can be associated with the first user account 330, and more than two user accounts 330 and 333 can be associated with the group account 337. In addition, other types of data are possible to store in the user accounts 330 and 333 and the device profiles 320 and 325A, 325B, . . . , 325K. For instance, user settings indicating a user preference for how a user prefers to use a computing device (e.g., when to ring a device) can be stored a corresponding user account. A device setting indicating how the computing device should be used (e.g., a do not disturb (DND) setting) can be stored in a corresponding device profile. A device status (e.g., whether in use, last time used, recent activity, or any other history of activity) can be stored in the user account or the device profile. An identifier of a space where the computing device is located (e.g., "kitchen") can also be stored in the user account.

A computer system, such as the computer system 110 of FIG. 1 or the computer system 210 of FIG. 2, generates the permission and restriction data 350 based on contextual data of an ongoing communications session that involves one of the computing devices 310, 315A, 315B, . . . , 315K (e.g., for illustrative purposes, the computing device 310). In an example, the permission and restriction data 350 indicates for each of the remaining computing devices (e.g., the computing devices 315A, 315B, . . . , 315K) whether transferring the data communications is permitted or restricted. In this example, the permission and restriction data 350 can be set as a flag stored in each of the corresponding device profiles (e.g., the device profiles 325A, 325B, . . . , 325K). In another example, the permission and restriction data 350 indicates for the other user accounts not involved in the ongoing communications session (e.g., the user account 335) whether transferring the data communications is permitted or restricted to the computing devices associated therewith (e.g., the computing devices 315A, 315B, . . . , 315K). In this example, the permission and restriction data 350 can be set as a flag stored in the other user accounts (e.g., the user account 335). In yet another example, the permission and restriction data 350 can be set at a group level (e.g., as a flag stored in association with the group account 337) whether transferring the data communications is permitted or restricted to the computing devices associated therewith (e.g., the computing devices 310, 315A, 315B, . . . , 315K).

FIGS. 4-16 and 20-21 show illustrative flows for managing data communications between computing devices, in accordance with various embodiments. Some or all of instructions for performing the operations of the illustrative flow can be implemented as hardware circuitry and/or stored as computer-readable instructions on a non-transitory computer-readable medium of a computer system, such as the computer system 110 of FIG. 1 or the computer system 210 of FIG. 2. As implemented, the instructions represent modules that include circuitry or code executable by a processor (s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

Figure 4:
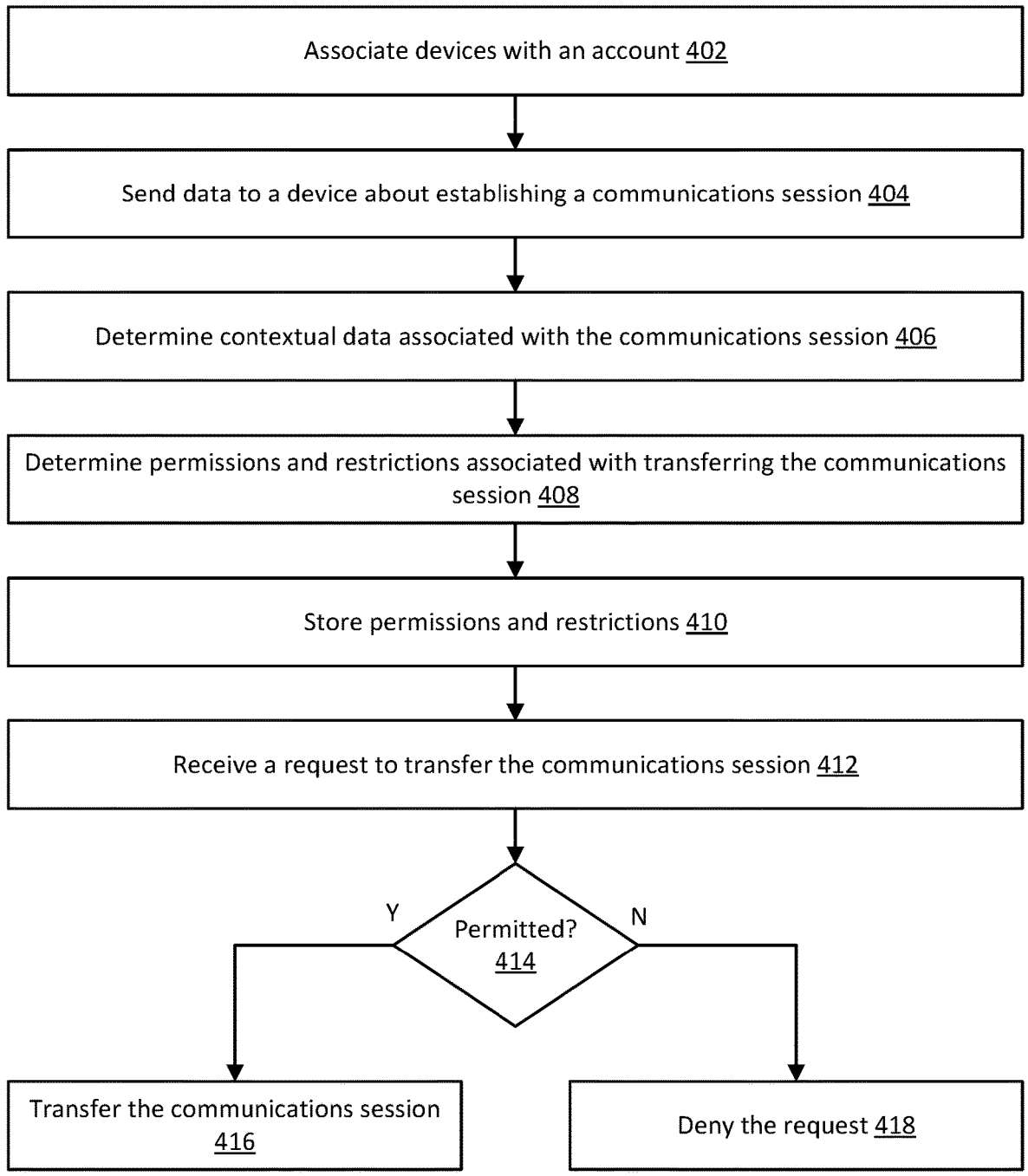
FIG. 4 illustrates an example flow for transferring data communications between devices based on permissions and restrictions, according to certain embodiments of the present disclosure.

FIG. 4 illustrates an example flow for transferring data communications between devices based on restrictions, according to certain embodiments of the present disclosure. In an example, the flow starts at operation 402, where the computer system associates devices with an account. Generally, associating a device with an account includes storing a device identifier in association with the account. For instance, the account stores the device identifier or a device profile that, in turn, stores the device identifier. The associating can be performed according to a registration process, where the computer system receives an identifier of the account and the device identifier from another computing entity. In an addition, the account can be a group account that includes a plurality of user accounts or a user account specific to a user.

At operation 404, the computer system sends data to a device about establishing a communications session. In an example, the device is associated with the account and is a recipient device. The data is sent in response to a request from an initiating device for data communications and includes instructions (e.g., a set of directives) to accept the request, set-up a connection with the initiating device, and exchange data with the initiating device over the connection according to a communications protocol.

At operation 406, the computer system determines contextual data associated with the communications session. For instance, the computer system determines from the request the original address associated with the data communications (e.g., a user account or a group account). The computer system also determines the device identifier of the recipient device and, based on the actual data exchanged in the communications session (e.g., audio and/or video data) a user identifier of a user operating the recipient device (e.g., the contact). The computer system also determines a geo-location of the recipient device by determining an IP address associated with the recipient device and placing a web request (or any other type of an application programming interface (API) call) to a GeoIP service. In addition, the computer system identifies a user account of the caller operating the initiating device and a user account of the contact. A contact list associated with the caller's user account and a list of permitted contacts (e.g., a whitelist) of the contact's user account can also be determined.

At operation 408, the computer system determines permissions and restrictions associated with transferring the communications session. In an example, the permissions and restrictions can be generated based on the contextual data and communications rules. The communications rule can define priorities for the contextual data, allowing overrides between the permissions and restrictions. For instance, the contextual data includes the original address and the user identifier. The original address indicates that the caller identified a group account in the request. A permission is set to allow transferring the data communications to any of the devices under the group account. However, the user identifier identifies a specific user associated with one particular account from the group account. Accordingly, a permission is set to allow transferring the data communication to any of the devices under the user account and a restriction is set to prohibit transferring the data communications to any of the other devices under the group account. In other words, in this illustrative example, the communications rule indicates that the permissions and restrictions set based on the user identifier should override the permissions and restrictions set based on the original address. These and other examples of generating and prioritizing the permissions and restrictions are further described in connection with the next figures.

At operation 410, the computer system stores the permissions and restrictions. In an example, the computer system stores permission and restriction data as one or more flags under one or more device profiles, one or more user accounts, and/or one or more group accounts as illustrated in FIG. 3.

At operation 412, the computer system receives a request to transfer the communications session. In an example, the request is received from the recipient device and corresponds to a transfer request. In another example, the request is received from one of the permitted devices and corresponds to a pick up request. In both example, the request can include text data and/or audio data identifying an intent (e.g., to transfer the data communications). This data can also, but need not, identify address (e.g., such data is specific device to transfer the data communications to or identifying a space where one or more devices are located, or such data is generic indicating an intent for the transfer but without specifying an address). If the text data is not structured and, instead, is a natural language format, NLU processing can be applied thereto to derive the intent and address. If audio data is received, ASR processing can be applied to generate text data and NLU processing can be applied to the text data to then determine the intent and address.

At operation 414, the computer system determines whether transferring the data communications from the recipient device is permitted. In an example, the computer system identifies one or more devices associated with the recipient device, where such devices can be associated with the same user account or group account as the recipient device. For each of such associated devices, the computer system determines the permission or restriction as generated under operation 408. If a single device is permitted, the data communications can be transferred to this single device. If multiple devices are permitted, the computer system can perform a selection of single device or receive a user selection of the single device from the multiple devices. Operation 416 may then follow operation 414. Otherwise, the computer system determines that no device is permitted and operation 418 may follow operation 414.

At operation 416, the computer system transfers the communications session to the permitted device. In an example, the computer system establishes a new communications session between the initiating device and the permitted device and terminates the communications session between the initiating device and the recipient device. In another example, the computer system maintains communications session between the initiating device and the recipient device and extends it such that the recipient device forwards data to and from the permitted device.

At operation 418, the computer system denies the request to transfer the communications session. In an example, the computer system sends a response to the recipient device (if it was the device that placed the request) indicating that the request is denied and instructing the recipient device to continue using the ongoing communications session. In another example where an associated device placed the request instead of the initiating device, the computer system sends a response to the associated device indicating that the request is denied.

Figure 5:
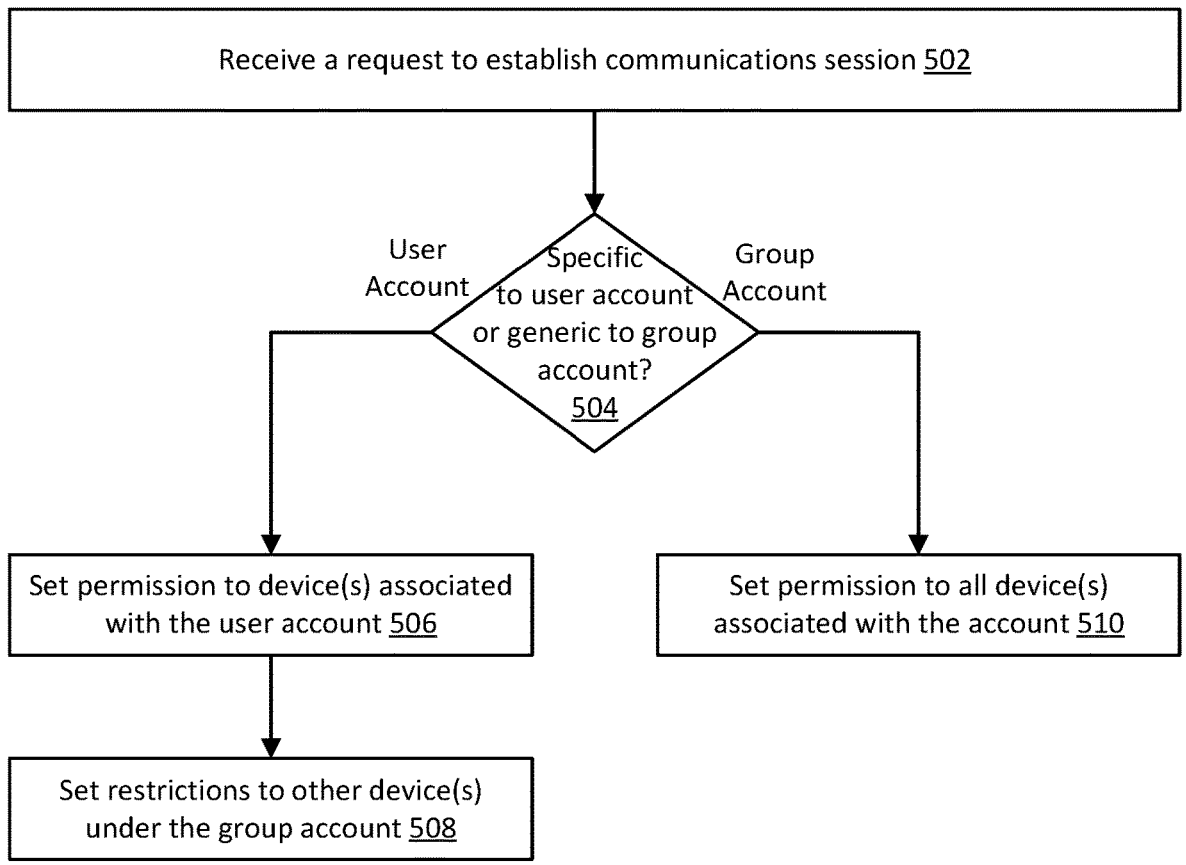
FIG. 5 illustrates an example flow for generating a restriction based on a requested address for data communications, according to certain embodiments of the present disclosure.

FIG. 5 illustrates an example flow for generating a restriction based on a requested address for data communications, according to certain embodiments of the present disclosure. In an example, the computer system receives a request from an initiating device of a caller for data communications. This request can indicate an address for the communications (e.g., an address of record corresponding to a group account or a specific user account). This address can be used as contextual data by the computer system to set up permission and restrictions on the resulting communications session.

As illustrated, the flow may start at operation 502, where the computer system receives the request to establish the communications session. In an example, the request can include text data and/or audio data. The text data can have a structured format that identifies an intent for (including the type of) the data communications (e.g., a call) and an address (e.g., a contact of the caller). For instance, such text data can be sent in response to a user selection for a call to the contact via a GUI of the initiating device. Alternatively, the text data can have a natural language format. NLU processing can then be applied thereto to determine the intent and the address. In comparison, audio data can correspond to a user utterance of the caller and generally follows a natural language format. In this case, ASR processing is applied to the audio data to generate text data and NLU processing is applied to the text data to determine the intent and the address. Alternatively, the audio data can have a structured format that identifies the intent and address.

At operation 504, the computer system determines whether the request is specific to a user account or is generating to a group account. In an example, the computer system performs a connection resolution by using the address to look up a contacts list from a caller's user account and find a match to a contact on the list. The contact can have a unique identifier that the computer system uses to look up user accounts and group accounts. A match to a group account indicates that the request is generic. A match to a user account indicates that the request is specific. In another example, machine learning is used. A machine learning model (e.g., one implementing an artificial neural network) is trained to classify a request between specific or generic. In this example, the received text data and/or audio data are input to the machine learning model. An output of the machine learning model includes a classification of whether the request is specific or generic. If the request is specific to a user account, operation 506 may follow operation 504. Otherwise, operation 510 may follow operation 510.

At operation 506, the computer system has determined that the request is specific to the user account. Accordingly, the computer system sets a permission to one or more device(s) associated with the user account. In an example, the user account is determined based on a match of a contact, per the connection resolution under operation 504. The computer system identifies the various devices associated with this user account. For each identified device, the computer system can generate and store permission data (e.g., a flag set to "1") indicating that the device is permitted. Alternatively, such permission data can be set at the user account level.

At operation 508, the computer system sets restrictions to one or more other devices under the group account. In an example, for any device that is associated with the group account but not the user account (e.g., a device associated with another user account that, in turn, is associated with the group account), the computer system can generate and store restriction data (e.g., a flag set to "0") indicating that the device is prohibited. Alternatively, such permission data can be set at the user account level.

At operation 510, the computer system that the request is specific to the group account. Accordingly, the computer system sets a permission to all device(s) associated with the group account. In an example, the group account is determined based on a match of a contact, as described in connection with operation 504. The computer system identifies the various devices associated with this group account. For each identified device, the computer system can generate and store permission data (e.g., a flag set to "1") indicating that the device is permitted. Alternatively, such permission data can be set at the user account level or group account level.

Figure 6:
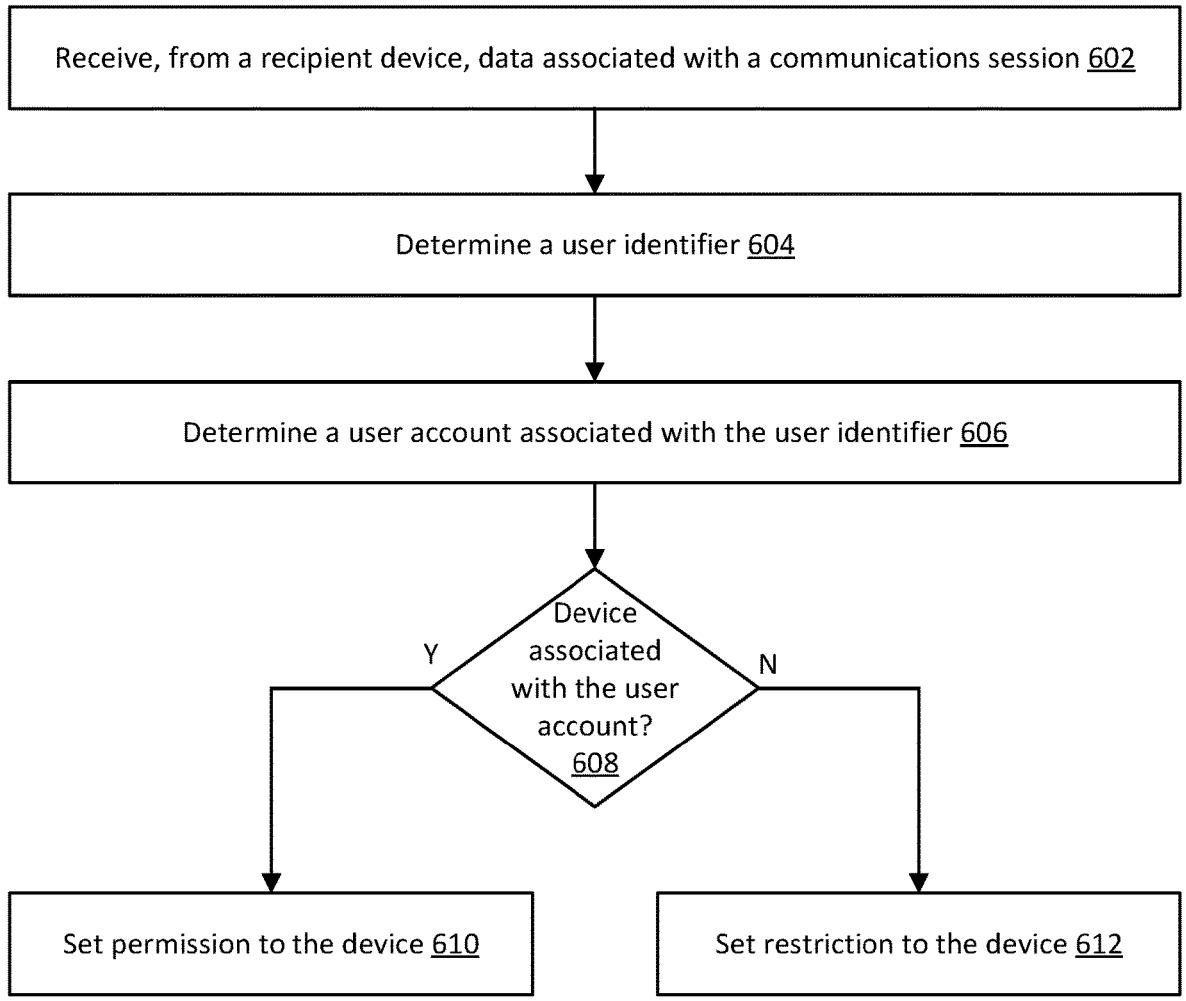
FIG. 6 illustrates an example flow for generating a restriction based on a user identifier associated with data communications, according to certain embodiments of the present disclosure.

FIG. 6 illustrates an example flow for generating a restriction based on a user identifier associated with data communications, according to certain embodiments of the present disclosure. In an example, the computer system has established a communications session with the initiating device of the caller and the recipient device of the caller's contact. Here, the original address may be specific to the contact or the contact's group account. The computer system can determine a user identifier of the contact, such as audio fingerprint data (e.g., in a data only communications session) and/or facial data (e.g., in a video communications session), and use the user identifier to derive one or more permissions and restrictions for transferring the data communications.

As illustrated, the flow may start at operation 602, where the computer system receives, from the recipient device, data associated with the communications session. In an example, different types of the received data are possible. For instance, the received data can represent a wakeword (e.g., "Alexa," "hey Siri," "Okay Google"). Such data may not be stored, but merely processed to generate an audio fingerprint and/or facial data. In another illustration, the received data can represent a request to transfer the data communications (e.g. "transfer my call"). In yet another illustration, the received data can include the actual audio data (and/or video data, as applicable) that is sent from the recipient device to the initiating device in the communications session. In the last two illustrations, such data is received only upon an explicit permission of the relevant user, is not stored, and is merely processed to generate an audio fingerprint and/or facial data in compliance with all legal and technical requirements. The user can opt in by providing the explicitly permission and can opt out any time by removing the permission or the permission may be automatically expired after a predefined period of time unless renewed by the user.

At operation 604, the computer system determines the user identifier based on the received data. In an example, different techniques are possible to determine the user identifier depending on the type of the received data. In case the received data corresponds to the response to the directive, the response can include a device identifier of the recipient device. The computer system uses the device identifier to determine one or more user accounts associated with the recipient device. If only one user account is found, the computer system determines the user identifier stored in this user account. If multiple user accounts are found and include more than one user identifier, the computer system can further use the audio data to select one of the user identifiers. In case the request to transfer the data communications is received, different types of processing are possible depending on the type of the request. For instance, if the request is sent from the recipient device in response to a selection of a GUI option, the request can similarly use the device identifier to identify the one or more user accounts and one or more user identifiers. In comparison, if the request includes audio data (e.g., "Alexa, transfer my call"), the computer system performs audio fingerprinting on the request to generate an audio fingerprint and sets the audio fingerprint as the user identifier. In these examples, if the received data includes facial data (e.g., in a video communication session), the computer system can also perform facial recognition to derive facial data and set the facial data as the user identifier.

At operation 606, the computer system determines a user account associated with the user identifier. In an example, the computer system uses the device identifier to identify one or more use accounts associated with the recipient device. If only a device identifier is available under operation 604, each user account is a candidate user account. However, if an audio fingerprint (e.g., pre-stored audio fingerprints) is available, the computer system compares the audio fingerprint with user identifiers stored in the user accounts to determine a match. When a match exists, the corresponding user account is a candidate user account. A similar matching can be performed based on facial data.

At operation 608, the computer system determines whether a device associated with a user account should be permitted or not. In an example, if a user account from the group account is determined as a candidate account per operation 604, devices that are associated with such an account should be permitted. Operation 610 may follow operation 608 and may be performed for each of such devices. If a user account from the group account is not a candidate account per operation 604, devices that are associated with such an account should be restricted. Operation 612 may follow operation 608 and may be performed for each of such devices. If a device is found to be associated with candidate and non-candidate user accounts, the device should be permitted. Operation 610 may follow operation 608 and may be performed for each of such a device.

At operation 610, the computer system has determined that transferring the communications session to a device is permitted. Accordingly, the computer system sets a permission to the device (e.g., at the device level or the user account level).

At operation 612, the computer system has determined that transferring the communications session to a device is restricted. Accordingly, the computer system sets a restriction to the device (e.g., at the device level or the user account level).

Figure 7:
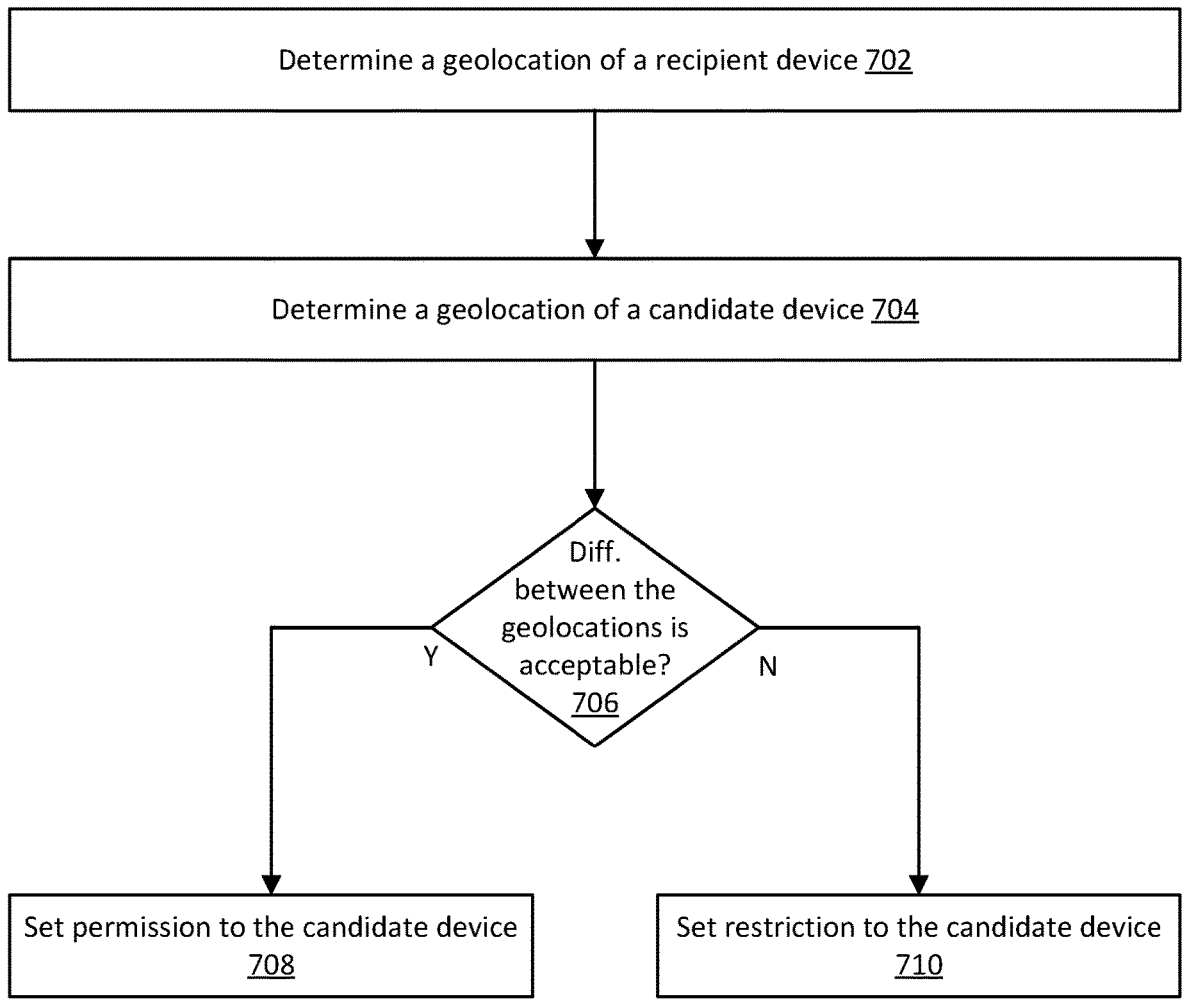
FIG. 7 illustrates an example flow for generating a restriction based on geolocations of devices, according to certain embodiments of the present disclosure.

FIG. 7 illustrates an example flow for generating a restriction based on locations of devices, according to certain embodiments of the present disclosure. In an example, the computer system has established a communications session between the initiating device of the caller and the recipient device of the caller's contact. The computer system can determine and use a location of the recipient device to derive one or more permissions and restrictions for transferring the communications session. Such permissions and restrictions can also further depend on the locations of the associated devices. A location of a device, as further illustrated in connection with FIG. 7, can indicate a geographic location (e.g., a geolocation) that includes the device. A location of a device can also indicate a computer network that includes the device (e.g., a network location), such as an IP address of the device and/or a service set identifier (SSID) of an access point to which the device is connected.

As illustrated, the flow may start at operation 702, where the computer system determines a geolocation of the recipient device. In an example, the computer system uses the IP address of the recipient device to place an API call to a GeoIP service. In response, the GeoIP service returns the geolocation at one or more resolution levels. The resolution levels can include a street address, a city, a region, or any other resolutions for a geographic location. The geolocation of the recipient device can be sufficient to set the permissions and restrictions for the associated devices. For instance, the communications rule may specify that transferring the communications session may be enabled at the group account level and/or user account level only if the recipient device is within a predefined geographic area. In this case, the computer system compares the geolocation of the recipient device and the specified geographic area. If the geographic location is within the predefined geographic area, the computer system sets the permissions at the group account level or user account level as applicable. Otherwise, restrictions can be set. In another illustration, the geolocations of the associated devices are used for the permissions and restrictions. If so, operations 704-710 can be performed.

At operation 704, the computer system determines a geolocation of a candidate device. In an example, the computer system identifies the devices that are associated with the recipient device. Each of such devices can be set as a candidate device. By also using the IP address of a candidate device, the computer system can place an API call and receive the geolocation of the candidate device from the GeoIP service.

At operation 706, the computer system determines a difference between the geolocation of the recipient device and a geolocation of a candidate device. In an example, the computer system compares the two geolocations to determine the difference. The communications rule can specific an acceptable difference (e.g., a difference threshold indicating that the two devices are located within a same predefined geographic area) for transferring the data communications. Accordingly, the computer system compares the difference to the acceptable difference to determine whether the candidate device should be permitted or restricted. If permitted, operation 708 may follow operation 706. Otherwise, operation 710 may be performed.

At operation 708, the computer system has determined that transferring the communications session to a candidate device is permitted. Accordingly, the computer system sets a permission to the candidate device (e.g., at the device level or the user account level).

At operation 710, the computer system has determined that transferring the communications session to a candidate device is restricted. Accordingly, the computer system sets a restriction to the candidate device (e.g., at the device level or the user account level).

As explained herein above, other types of locations can be used. In an example, the example flow of FIG. 7 can be similarly applied to determine an SSID of the access point to which the recipient device is connected and an SSID of the access point to which the candidate device is connected.

If the two SSIDs match, a permission is generated. Otherwise, a restriction is generated. In another example, the example flow of FIG. 7 can be similarly applied to determine an IP address of the recipient device and an IP address of the candidate device is connected. If the two IP addresses belong to a same network, a permission is generated. Otherwise, a restriction is generated.

Figure 8:
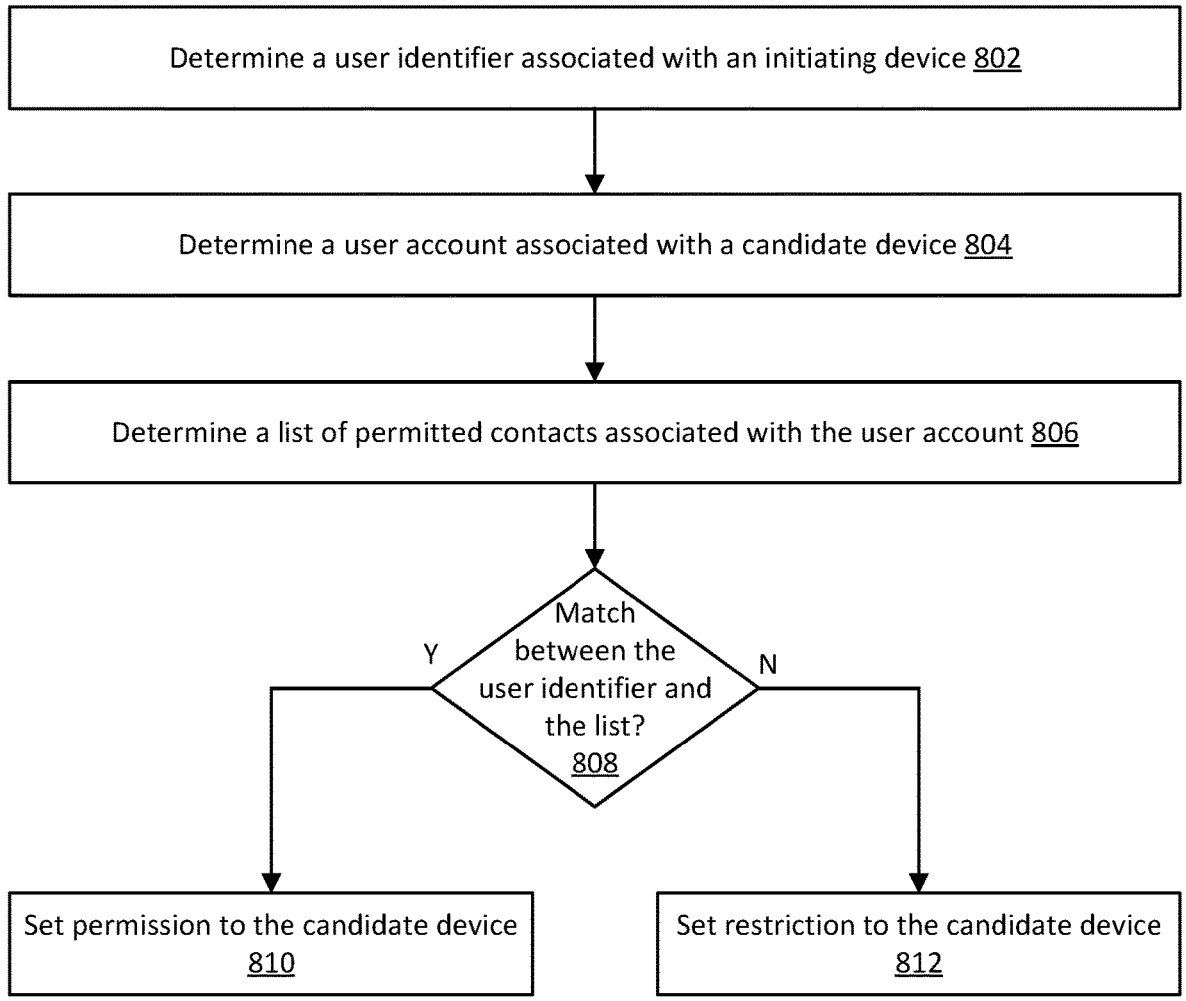
FIG. 8 illustrates an example flow for generating a restriction based on a list of permitted contacts, according to certain embodiments of the present disclosure.

FIG. 8 illustrates an example flow for generating a restriction based on a list of permitted contacts, according to certain embodiments of the present disclosure. In an example, the computer system has established a communications session between the initiating device of the caller and the recipient device of the caller's contact. The recipient device can be associated with a candidate device, where this candidate device is associated with a user account. The user account can include a list of permitted contacts that limit the data communications to this candidate device to specific contacts. Hence, if the caller can be matched to a contact from the permitted contacts, transferring the communications session from the recipient device to the candidate device is permitted. Otherwise, transferring the communications session is restricted.

As illustrated, the flow may start at operation 802, where the computer system determines a user identifier associated with an initiating device. In an example, the computer system can derive the user identifier from the user account of the caller. The user identifier can identify the user account or can specifically identify the caller (e.g., include an audio fingerprint and/or facial data of the caller).

At operation 804, the computer system determines a user account associated with a candidate device. In an example, the computer system identifies the devices associated with the recipient account and sets each of such associated devices as a candidate device. For each candidate device, the computer system determines the user account with which the candidate device is associated.

At operation 806, the computer system a list of permitted contacts associated with a user account. In an example, for each of the user accounts determined under operation 804, the computer system determines whether the user account includes a list of permitted contacts or not. If such a list is included, operations 808-812 can be performed. Otherwise, the computer system determines that no restriction should be applied.

At operation 808, the computer system determines whether a match exists between the user identifier and a list of permitted contacts. Here, the list corresponds to a candidate device associated with a user account. If a match exists, such a match indicates that the caller is permitted and, thus, the candidate device should be permitted for transferring the communications session thereto. Otherwise, the caller is restricted and, thus, the candidate device should be restricted.

At operation 810, the computer system has determined that transferring the communications session to a candidate device is permitted. Accordingly, the computer system sets a permission to the candidate device (e.g., at the device level or the user account level).

At operation 812, the computer system has determined that transferring the communications session to a candidate device is restricted. Accordingly, the computer system sets a restriction to the candidate device (e.g., at the device level or the user account level).

Figure 9:
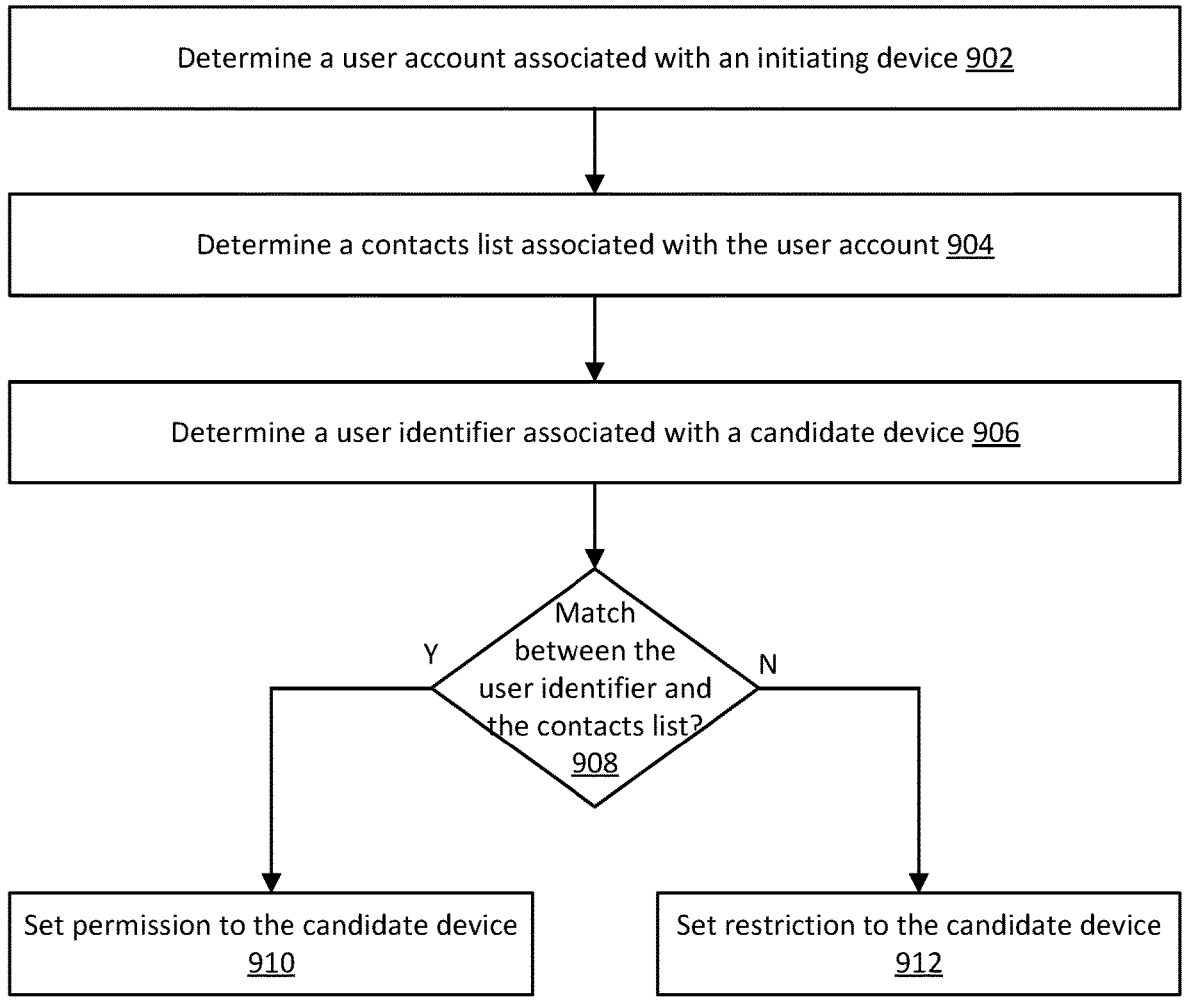
FIG. 9 illustrates an example flow for generating a restriction based on a contacts list associated with an initiating device, according to certain embodiments of the present disclosure.

FIG. 9 illustrates an example flow for generating a restriction based on a contacts list associated with an initiating device, according to certain embodiments of the present disclosure. In an example, the computer system has established a communications session between the initiating device of the caller and the recipient device of the caller's contact. The initiating device can be associated with a user account that includes a contacts list of the caller. The contact can be matched to the caller's contact list. A candidate device can be permitted if this device is also associated with a contact that can be matched to the caller's contact list.

As illustrated, the flow may start at operation 902, where the computer system determines the user account associated with the initiating device. At operation 904, the computer system determines the contacts list associated with the user account (e.g., the caller's contact list).

At operation 906, the computer system determines a user identifier associated with a candidate device. In an example, the computer system identifies the devices associated with the recipient account and sets each of such associated devices as a candidate device. For each candidate device, the computer system determines the user account with which the candidate device is associated. The computer system further determines the user identifier corresponding to each user account.

At operation 908, the computer system determines whether a match exists between a user identifier associated with a candidate device and the caller's contacts list. If a match exists, the candidate device should be permitted for transferring the communications session thereto. Otherwise, the candidate device should be restricted.

At operation 910, the computer system has determined that transferring the communications session to a candidate device is permitted. Accordingly, the computer system sets a permission to the candidate device (e.g., at the device level or the user account level).

At operation 912, the computer system has determined that transferring the communications session to a candidate device is restricted. Accordingly, the computer system sets a restriction to the candidate device (e.g., at the device level or the user account level).

The various operations described in connection with FIGS. 5-9 represent an embodiment of a set of communications rules. This set can also specify priorities between the permissions and restrictions such that a restriction applicable to a device can override a permission applicable to the device and, vice versa, based on the contextual data used to generate the restriction and the permission. For instance, a permission generated based on a user identifier can override a restriction generated based on an original address. Similarly, a restriction generated based on the user identifier can override a permission generated based on the original address. In another illustration, a restriction generated based on a location can override a permission generated based on the user identifier. In comparison, a permission generated based on the location can necessitate a user confirmation to override a restriction generated based on the user identifier.

Figure 10:
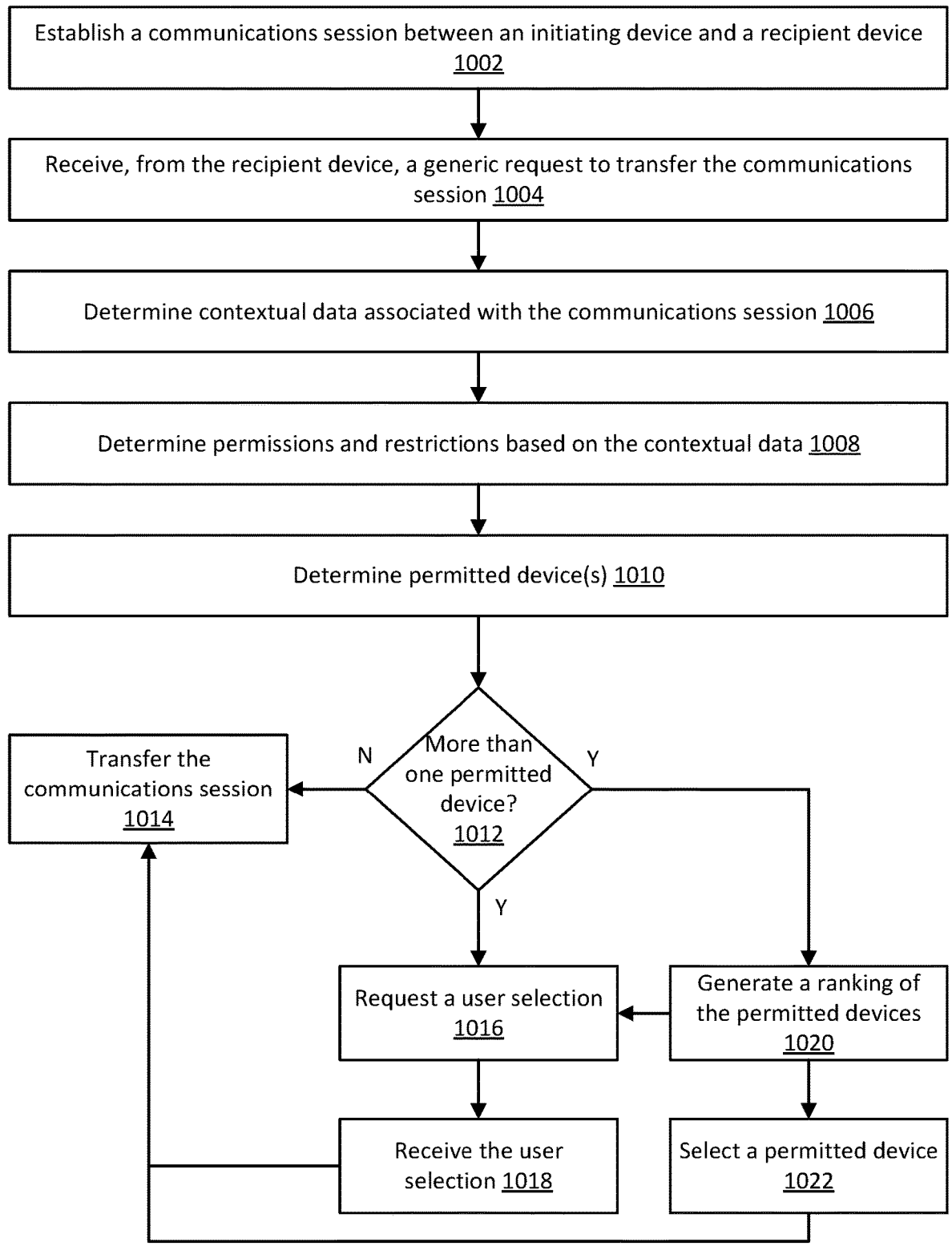
FIG. 10 illustrates an example flow for transferring a communications session based on a generic transfer request, according to certain embodiments of the present disclosure.

FIG. 10 illustrates an example flow for transferring a communications session based on a generic transfer request, according to certain embodiments of the present disclosure. In an example, a communications session exists between an initiating device and a recipient device. A request to transfer the communications session can be received from the recipient device (e.g., a transfer request). This request can be generic and may not identify a specific target device or a specific space to which the communications session should be transferred. In this example, the computer system can identify multiple candidate devices before the communications session is transferred to one or more of them.

As illustrated, the flow may start at operation 1002, where the computer system establishes the communications session between the initiating device and the recipient device. At operation 1004, the computer system receives, from the recipient device, a generic request to transfer the communications session (e.g., "Alexa, transfer my call"). In an example, the generic request is sent from the recipient device based on a GUI option or as audio data from a user utterance and does not identify a specific address device or a specific space to which the communications session should be transferred.

At operation 1006, the computer system determines contextual data associated with the communications session. In an example, the contextual data can include any, a combination, or all of the original address of the request for the communications session, user identifiers involved in the data communications, user requests received during the communication session, locations of devices, contacts lists, and/or lists of permitted contacts as described in connection with FIGS. 5-9.

At operation 1008, the computer system determines permissions and restrictions based on the contextual data. In an example, the computer system derives the permissions and restrictions from the contextual data based on a set of communications rules as described herein above in connections with FIGS. 5-9.

At operation 1010, the computer system determines one or more permitted devices. In an example, the computer system determines the devices that are associated with the recipient device. Each of the associated devices can be set as a candidate device. The computer system determines whether each candidate device is permitted or restricted based on the permission and restriction data that is applicable to the candidate device.

At operation 1012, the computer system determines whether more than one permitted device is available for transferring the data communications thereto. If not, operation 1014 may follow operation 1012. Otherwise, operation 1016 or operation 1020 may follow operation 1012.

At operation 1014, the computer system has determined that a single permitted device is available. Accordingly, the computer system transfers the communications session from the recipient device to this permitted device.

At operation 1016, the computer system has determined that multiple permitted devices are available. Under this operation, the computer system sends a request for a user selection of a permitted device from the multiple permitted devices. In an example, the computer system sends data (e.g., a directive) to the recipient device, where the data identifies the permitted devices and instructs the recipient device to identify the permitted devices and solicit the user selection. The presentation and/or user selection can be via a GUI and/or a VUI.

At operation 1018, the computer system receives the user selection from the recipient device. In an example, the user selection identifies one of the permitted devices. The computer system transfers the data communications to this identified device by performing operation 1014.

At operation 1020, the computer system generates a ranking of the permitted devices. This operation can be performed be performed prior to operation 1016 and its output can be used as an input to operation 1016. Alternatively, operation 1020 can be performed in lieu of operation 1016 and can be followed by operation 1022. In both cases, the computer system generates the ranking based on a set of communications rules that prioritizes the permitted devices according to a set of factors. The set of factors includes the capabilities of the permitted devices (e.g., audio capability to support audio communications, video capability to support video communications, etc.), a history of device activities (e.g., time since a permitted device was last used, frequency of using a permitted device, strength of an audio signal detected a permitted device, etc.), a user setting (e.g., a user preference to use a device), a device setting (e.g., a DND setting), and a device status (e.g., busy, available, in power saving mode). The communications rules can specify that a first permitted device should be ranked higher than a second one if the first one supports video capability and the second one does not. The communications rules can also specify that the first permitted device should have a higher ranking if a user is more likely present next to this device based on the history, if a user preference indicates so, and/or if a device setting indicates that the device is available for the data communications. When operation 1016 follows operation 1020, the computer system can further instruct the recipient device to identify the permitted devices (e.g., the highest ranked device is identified first) or to identify only a subset of the permitted devices (e.g., only the top three devices) according to the ranking.

At operation 1022, the computer system can select a permitted device from the permitted devices based on the ranking. In an example, the computer system selects the highest ranked permitted device. In other words, rather than requesting and waiting for a user selection, the computer system performs and automatic selection. The computer system transfers the data communications to the selected device by performing operation 1014.

Figure 11:
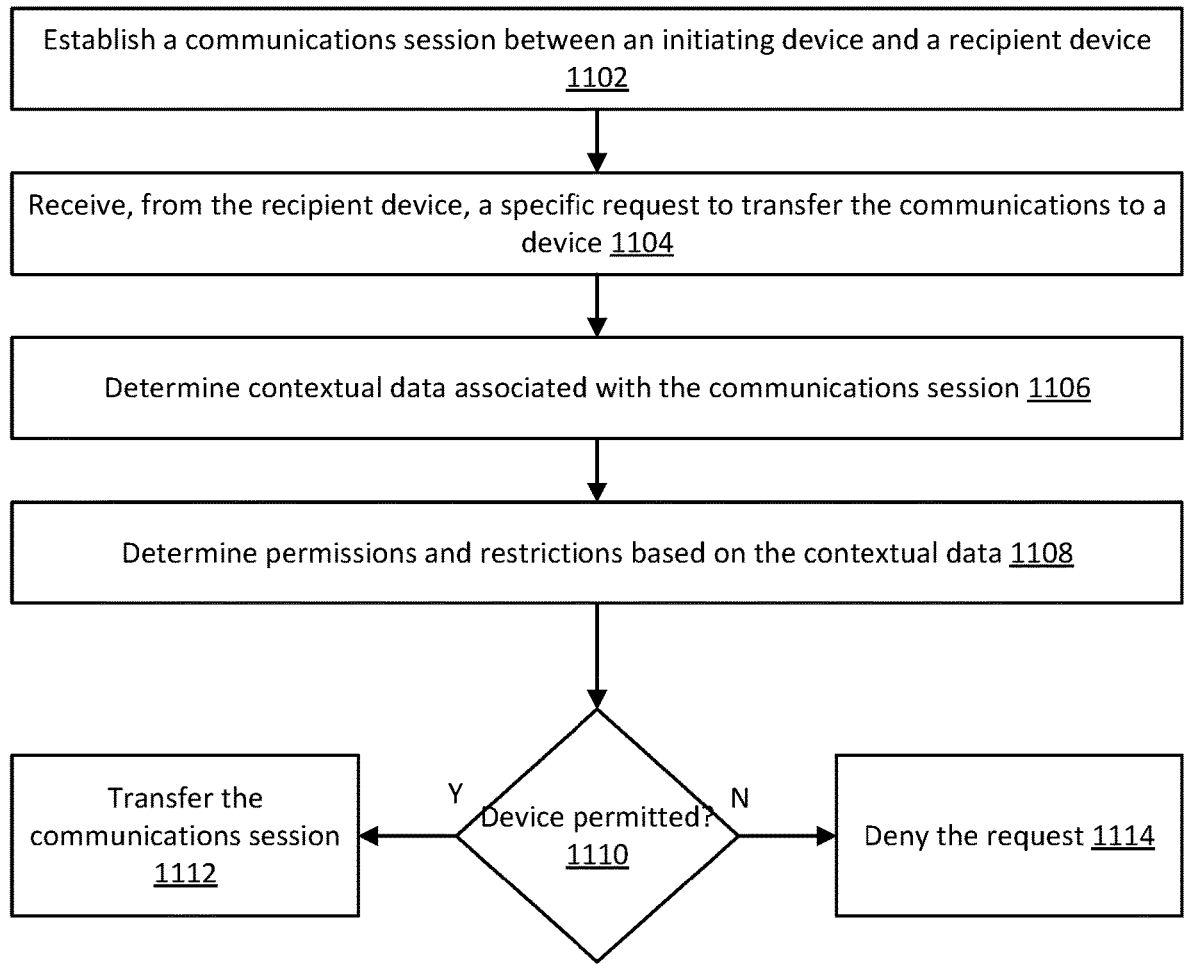
FIG. 11 illustrates an example flow for transferring a communications session based on a specific transfer request, according to certain embodiments of the present disclosure.

FIG. 11 illustrates an example flow for transferring a communications session based on a specific transfer request, according to certain embodiments of the present disclosure. In an example, a communications session exists between an initiating device and a recipient device. A request to transfer the communications session can be received from the recipient device (e.g., a transfer request). This request can be specific by identifying a target device to which the communications session should be transferred. In this example, the computer system can determine whether the target device permitted or not. If permitted, the data communications can be transferred from the recipient device to the target device.

As illustrated, the flow may start at operation 1102, where the computer system establishes the data communications between the initiating device and the recipient device. At operation 1104, the computer system receives, from the recipient device, a specific request to transfer the data communications to a target device (e.g., "Alexa, transfer my call to 'Device ABC'"). In an example, the specific request is sent from the recipient device based on a GUI option or as audio data from a user utterance and identifies a specific target device to which the data communications should be transferred.

At operation 1106, the computer system determines contextual data associated with the communications session, similarly to operation 1006 of FIG. 10. At operation 1108, the computer system determines permissions and restrictions based on the contextual data, similarly to operation 1008 of FIG. 10. Here, the computer system identifies the target device from the request and retrieves the permission and restriction data applicable to the target device.

At operation 1110, the computer system determines whether the target device is permitted or not. In an example, the permission and restriction data indicates whether transferring the data communications to the target device is permitted. If so, operation 1112 may follow operation 1110. Otherwise, operation 1114 may follow operation 1110.

At operation 1112, the computer system the computer system transfers the communications session from the recipient device to this permitted device. At operation 1114, the computer system denies the request to transfer the communications session. In an example, denying the request includes sending data (e.g., a directive) to the recipient device indicating the denial and instructing the recipient device to present the denial and continue using the communications session.

Figure 12:
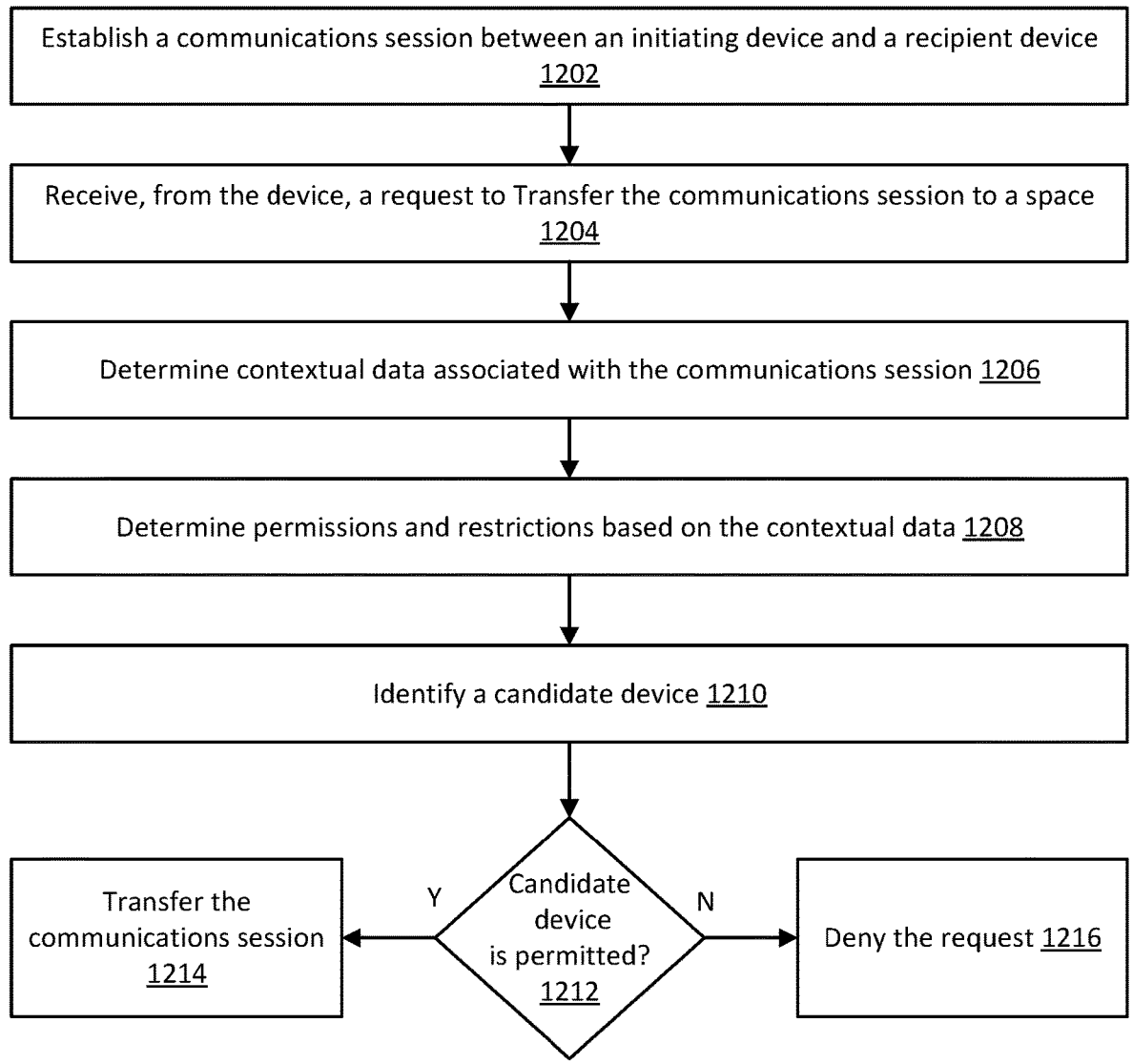
FIG. 12 illustrates an example flow for transferring a communications session based on a transfer request identifying a space, according to certain embodiments of the present disclosure.

FIG. 12 illustrates an example flow for transferring a communications session based on a transfer request identifying a space, according to certain embodiments of the present disclosure. In an example, a communications session exists between an initiating device and a recipient device. A request to transfer the communications session can be received from the recipient device (e.g., a transfer request). This request can be specific by identifying a target space, where one or more candidate devices can be located and to which the data communications can be transferred. In this example, the computer system can determine the candidate devices in the space and determine a permitted one for transferring the data communications.

As illustrated, the flow may start at operation 1202, where the computer system establishes the data communications between the initiating device and the recipient device. At operation 1204, the computer system receives, from the recipient device, a specific request to transfer the communications session to a target space (e.g., "Alexa, transfer my call to the Kitchen"). In an example, the specific request is sent from the recipient device based on a GUI option or as audio data from a user utterance and identifies the target space to which the communications session should be transferred.

At operation 1206, the computer system determines contextual data associated with the communications session, similarly to operation 1006 of FIG. 10. At operation 1208, the computer system determines permissions and restrictions based on the contextual data, similarly to operation 1008 of FIG. 10.

At operation 1210, the computer system determines a candidate device that is located in the target space. In an example, the recipient device and the associated devices are associated with one or more user accounts that can belong to one or more group accounts. Each of such accounts can store a space identifier identifying the space in which the respective device(s) are located. Accordingly, the computer system can determine a match between the target space and a space identifier stored under an account and can identify candidate devices that are associated with this account.

At operation 1212, the computer system determines whether a candidate device is permitted or not. In an example, the permission and restriction data indicates whether transferring the communications session to the target device is permitted. If so, operation 1214 may follow operation 1212. Otherwise, operation 1216 may follow operation 1212, where none of the candidate device(s) located in the requested space are permitted.

At operation 1214, the computer system the computer system transfers the communications session from the recipient device to a candidate device found to be permitted. If multiple candidate devices are permitted, operation 1214 can include sub-operations similar to operations 1016-1022 of FIG. 10 to select one of these permitted devices. At operation 1216, the computer system denies the request to transfer the communications session. In an example, denying the request includes sending data (e.g., a directive) to the recipient device indicating the denial and instructing the recipient device to present the denial and continue using the communications session.

Figure 13:
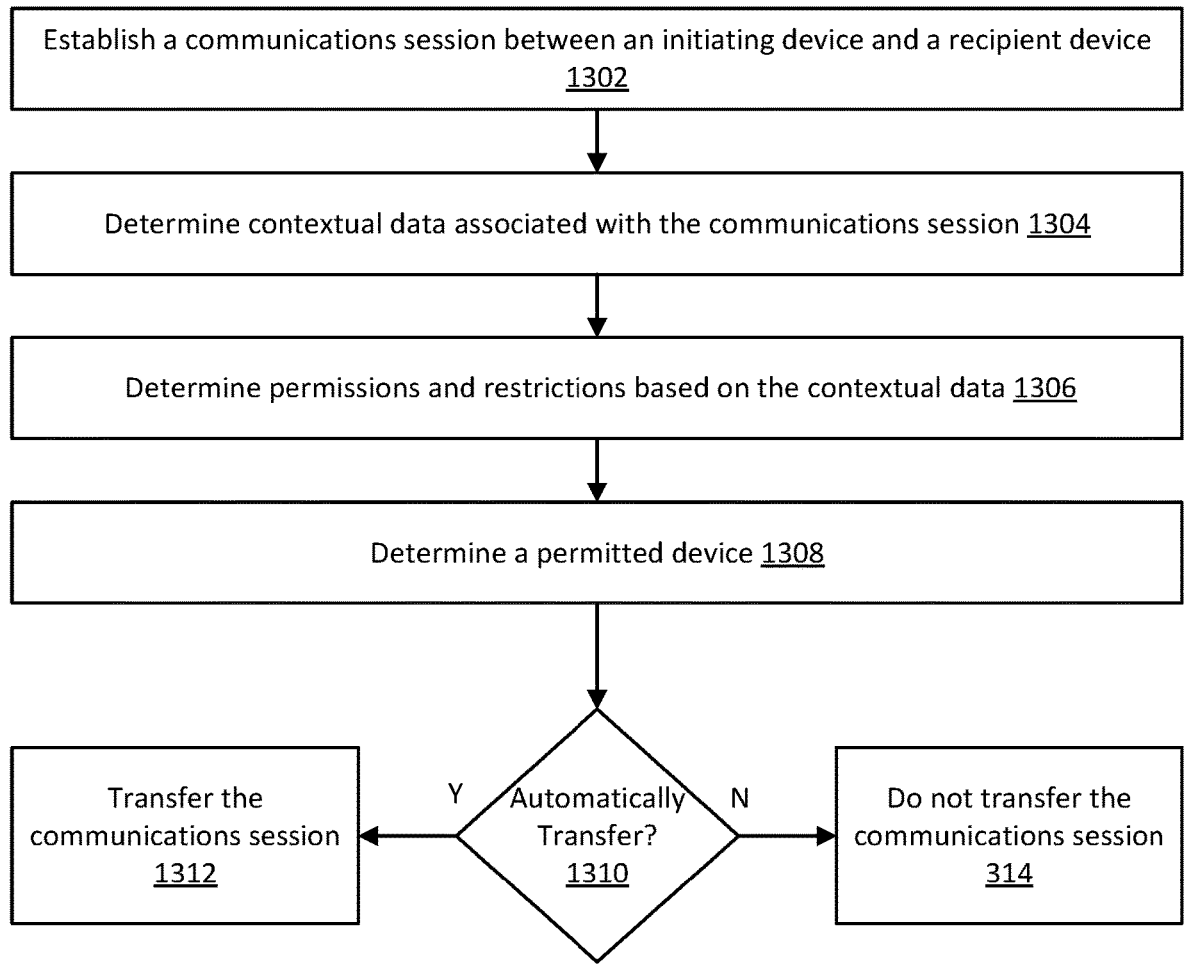
FIG. 13 illustrates an example flow for automatically transferring a communications session, according to certain embodiments of the present disclosure.

FIG. 13 illustrates an example flow for automatically transferring a communications session, according to certain embodiments of the present disclosure. In an example, a communications session exists between an initiating device and a recipient device. The computer system can identify the associated devices and their permissions and restrictions. As the user operating the recipient device changes their location, presence information of the user relative to a permitted device (e.g., the audio signal strength detected by the associated device in response to utterances of the user) and the status of the permitted device (e.g., available, set to a DND mode, etc.) can be used by the computer system to automatically transfer the data communications from the recipient device to the permitted device.

As illustrated, the flow may start at operation 1302, where the computer system establishes the data communications between the initiating device and the recipient device. At operation 1304, the computer system determines contextual data associated with the communications session, similarly to operation 1006 of FIG. 10. At operation 1306, the computer system determines permissions and restrictions based on the contextual data, similarly to operation 1008 of FIG. 10.

At operation 1308, the computer system determines a permitted device. In an example, the computer system identifies the subset of associated devices to which the communications session are permitted. Each device in this subset is set as a candidate device. Given the presence information and the device status of each of the candidate devices, the computer system selects one of them and sets this device as the permitted device. For instance, the computer system selects the candidate device that has the highest signal strength and that has a device setting permitting the communications session.

At operation 1310, the computer system determines whether transferring the communications session automatically to the permitted device is authorized or not. In an example, a preset authorization is stored as user setting stored in the permitted device's profile, the applicable user account, and/or the applicable group account. If so, operation 1312 may follow operation 1310. Otherwise, operation 1314 may follow operation 1310.

At operation 1312, the computer system the computer system transfers the communications session from the permitted device. At operation 1314, the computer system does not transfer the data communications to the permitted device. Instead, the computer system may select another permitted device and perform operation 1310 to check whether the pre-set authorization exists for this device. Otherwise, none of the permitted devices are available and the communications session are not transferred from the recipient device.

Figure 14:
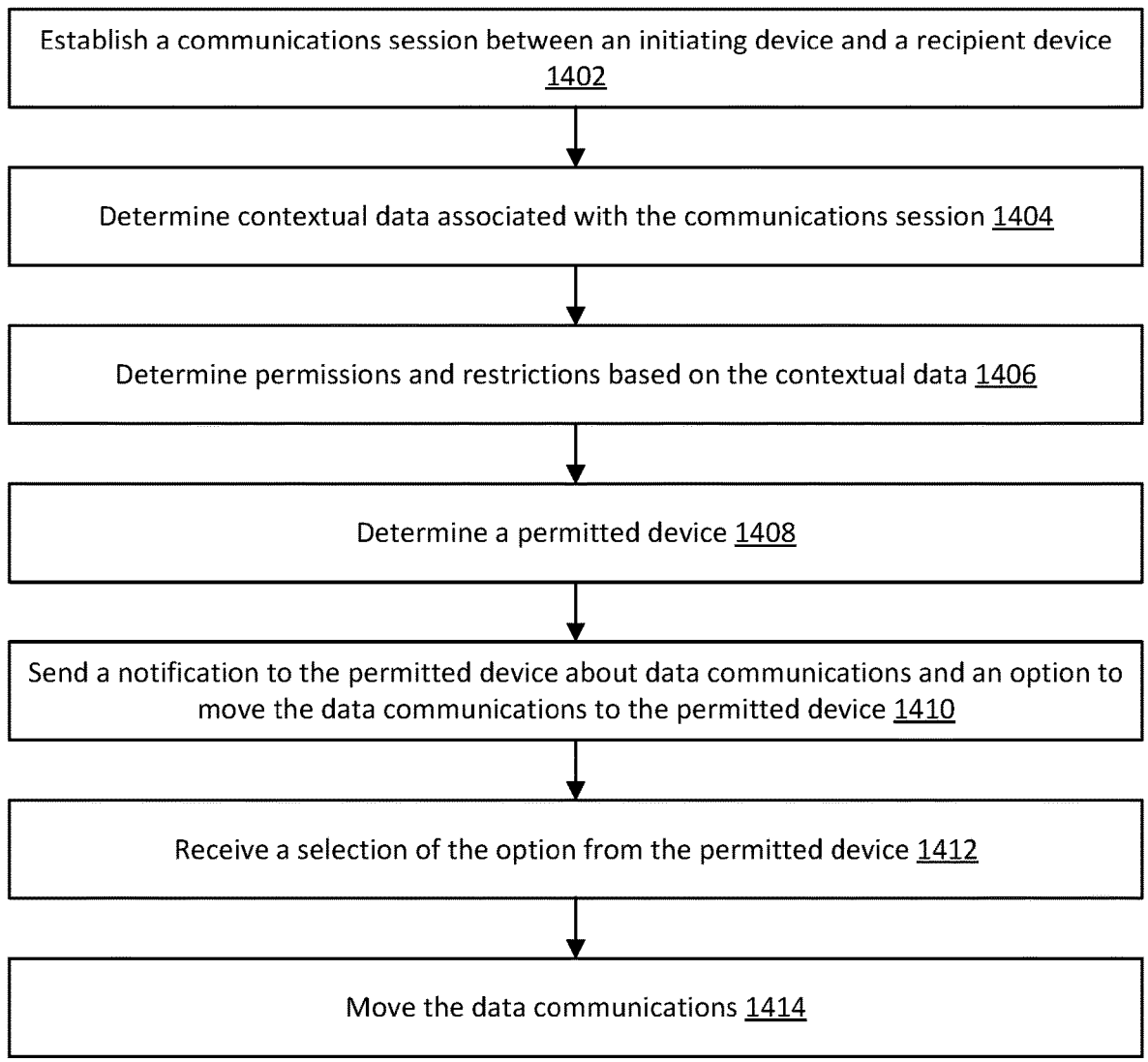
FIG. 14 illustrates an example flow for sending a notification to a device about an option to pick up a communications session, according to certain embodiments of the present disclosure.

FIG. 14 illustrates an example flow for sending a notification to a device about an option to pick up data communications, according to certain embodiments of the present disclosure. In an example, a communications session exists between an initiating device and a recipient device. The computer system can determine a permitted device to which the communications 0961776 can be transferred and sends a notification, such as a push notification, to the permitted device about an option to transfer the data communications.

As illustrated, the flow may start at operation 1402, where the computer system establishes the data communications between the initiating device and the recipient device. At operation 1404, the computer system determines contextual data associated with the communications session, similarly to operation 1006 of FIG. 10. At operation 1406, the computer system determines permissions and restrictions based on the contextual data, similarly to operation 1008 of FIG. 10.

At operation 1408, the computer system determines a permitted device. In an example, the computer system identifies the subset of associated devices to which the data communications are permitted. Each device in this subset is set as a permitted device.

At operation 1410, the computer system sends a notification to a permitted device about the ongoing data communications and an option to transfer the ongoing data communications to the permitted device. In an example, the notification is sent in a push transmission. The transmission can push data that includes the session identifier of the communications session, the identifier of the initiating device and/or call, and the identifier of the recipient device and/or contact. The data can also include instructions to present a selectable GUI option to transfer the ongoing data communications and/or to present an alert about the ongoing data communications (e.g., present a message on a locked menu screen, emit a light from a light source in particular pattern and/or wavelength).

At operation 1410, the computer system receives a user selection of the option from the permitted device. In an example, the user selection is received as data indicating a selection of the GUI option. In another example, the user selection is received as audio data corresponding to an utterance of the user requesting the data communications to be transferred. At operation 1414 the computer system the computer system transfers the data communications from the permitted device.

Figure 15:
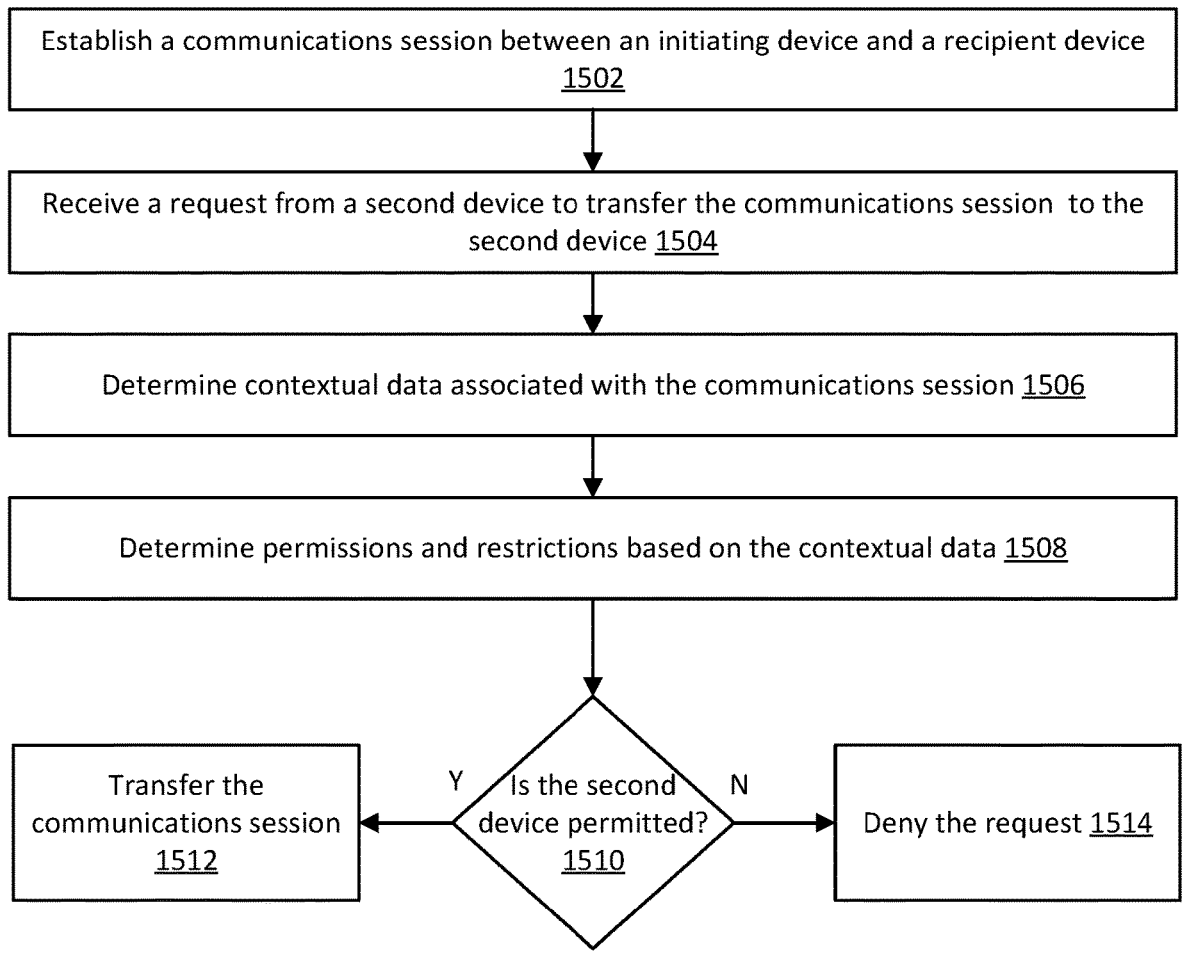
FIG. 15 illustrates an example flow for responding a notification to a device about an option to pick up a communications session, according to certain embodiments of the present disclosure.

FIG. 15 illustrates an example flow for responding a notification to a device about an option to pick up a communications session, according to certain embodiments of the present disclosure. In an example, a communications session exists between an initiating device and a recipient device. The receipting device is associated with a second device. The computer system receives a request from the second device to transfer the communications session thereto (e.g., a pick up request) and determines whether the second device is permitted or not.

As illustrated, the flow may start at operation 1502, where the computer system establishes the data communications between the initiating device and the recipient device. At operation 1504, the computer system receives, from the second device, a request to transfer the communications session to the second device. In an example, the request is received as audio data representing an utterance of the user of the second device for the transfer.

At operation 1506, the computer system determines contextual data associated with the communications session, similarly to operation 1006 of FIG. 10. At operation 11508, the computer system determines permissions and restrictions based on the contextual data, similarly to operation 1008 of FIG. 10.

At operation 1510, the computer system determines whether the second device is a permitted device. In an example, the permission and restriction data associated with the second device indicates whether transferring the communications session to the second device is permitted. If so, operation 1512 may follow operation 1510. Otherwise, operation 1514 may follow operation 1510.

At operation 1512, the computer system transfers the communications session from the recipient device to the second device. At operation 1514, the computer system denies the request to transfer the communications session. In an example, denying the request includes sending data (e.g., a directive) to the second device indicating the denial.

Figure 16:
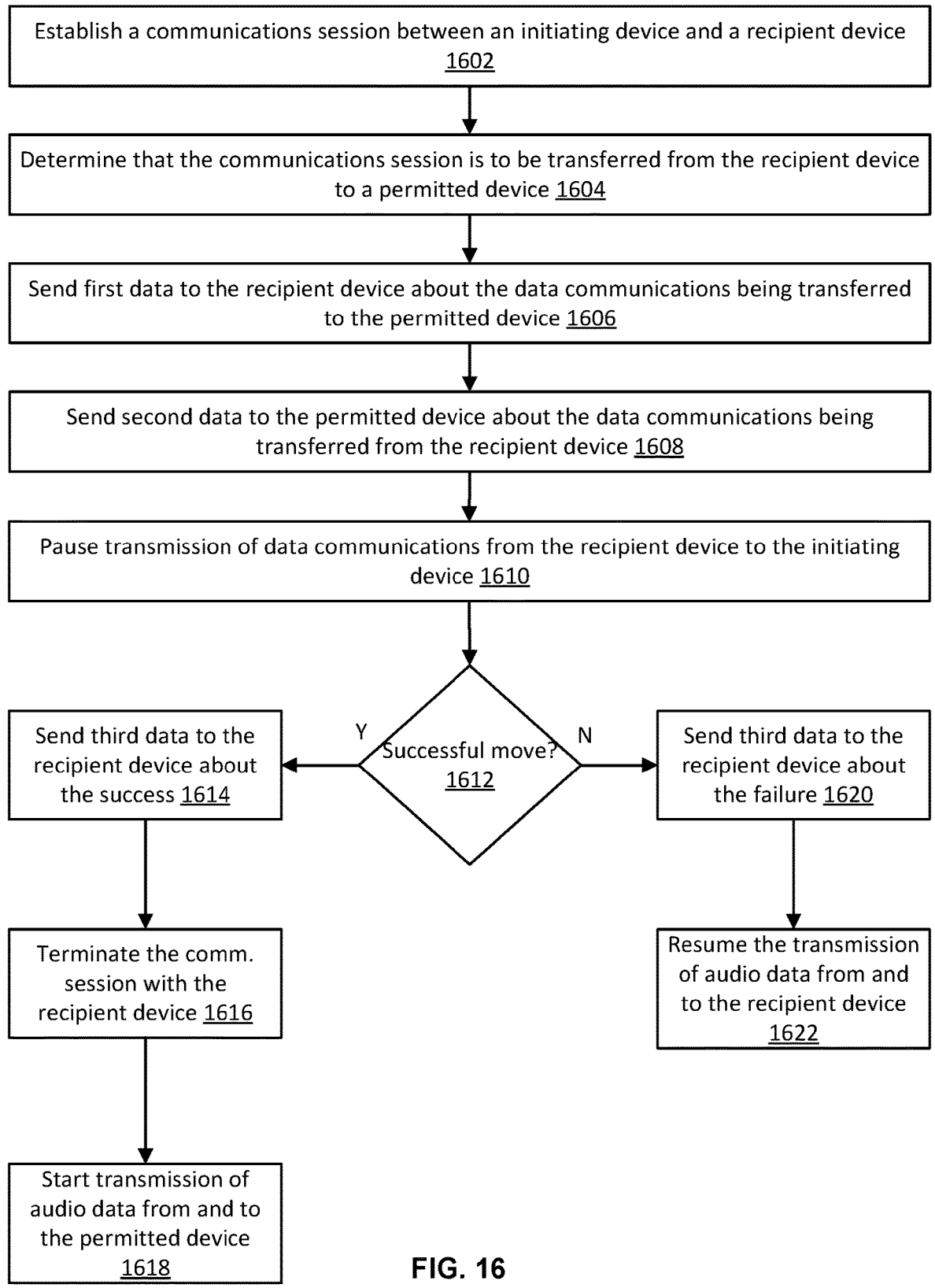
FIG. 16 illustrates an example flow for instructing devices about transferring a communications session, according to certain embodiments of the present disclosure.

FIG. 16 illustrates an example flow for instructing devices about transferring a communications session, according to certain embodiments of the present disclosure. In an example, a communications session exists between an initiating device of a caller and a recipient device of a contact of the caller. The computer system receives a request to transfer the data communications from the recipient device to a permitted device. This request can be a transfer request received from the recipient device or a pick up request received from the permitted device. The computer system can send data about the transfer to both the recipient device and the permitted device.

As illustrated, the flow may start at operation 1602, where the computer system established the communications session between the initiating device and the recipient device. At operation 1604, the computer system determines that the communications session can be transferred from the recipient device to the permitted device. In an example, the computer performs this determination in response to a transfer request, similarly to the example flows of FIGS. 10-13. In another example, the computer performs this determination in response to a pick up request, similarly to the example flows of FIGS. 14-15.

At operation 1606, the computer system sends first data to the recipient device about the communications session being transferred to the permitted device. In an example, the first data includes instructions (e.g., a directive) to present an identifier of the permitted device and an indication that the communications session is being transferred.

At operation 1608, the computer system sends second data to the permitted device about the communications session being transferred from the recipient device. In an example, the second data includes instructions (e.g., a directive) to present an identifier of the recipient device and/or the contact and of the initiating device and/or the caller and an indication that the communications session is being transferred. In addition, at operation 1608, the computer system determines that the request to establish the communications session is associated with a communications application of the initiating device. The computer system also determines that the communications application is associated with a ringtone (e.g., the computer system stores associations between ringtones and identifiers of communications applications). In this case, the second data sent to the permitted device instruct the permitted device to output (e.g., play) the ringtone.

At operation 1610, the computer system pauses a transmission of the data communications from the recipient device to the initiating device. In an example, the computer receives audio data (and, video data depending on the type of the communications session) from the recipient device between the time the transfer request is made and the transferring the communications session succeeds or fails. The computer system pauses the transmission of this audio data (and video data, as applicable). Similarly, the transmission of audio and/or video data received from the initiating device and destined to the recipient device can be paused.

At operation 1612, the computer system determines whether transferring the communications session was successful. In an example, the transfer is successful if the permitted device sends acceptance data accepting the transfer of the communications session. Otherwise, the instructions to transfer the communications session is deemed to have timed out and the transfer has failed.

At operation 1614, the computer system has determined that the transfer succeeded. Accordingly, the computer system sends third data to the recipient device about the success. The third data includes instructions (e.g., a directive) to terminate the communications session between the initiating device and the recipient device.

At operation 1616, the computer system terminates the communications session between the initiating device and the recipient device. For instance, the connection between these two devices is terminated.

At operation 1618, the computer system starts transmission of audio data (and, video data as applicable) from and to the permitted device. In an example, the data communications in the communications session start between the initiating device and the permitted device.

At operation 1620, the computer system has determined that the transfer failed. Accordingly, the computer system sends third data to the recipient device about the failure. The third data includes instructions (e.g., a directive) to continue using the communications session between the initiating device and the recipient device.

At operation 1622, the computer system resumes the transmission of audio data (and, video data as applicable) from and to the permitted device. In an example, the data communications in the communications session resume between the initiating device and the recipient device.

Figure 17:
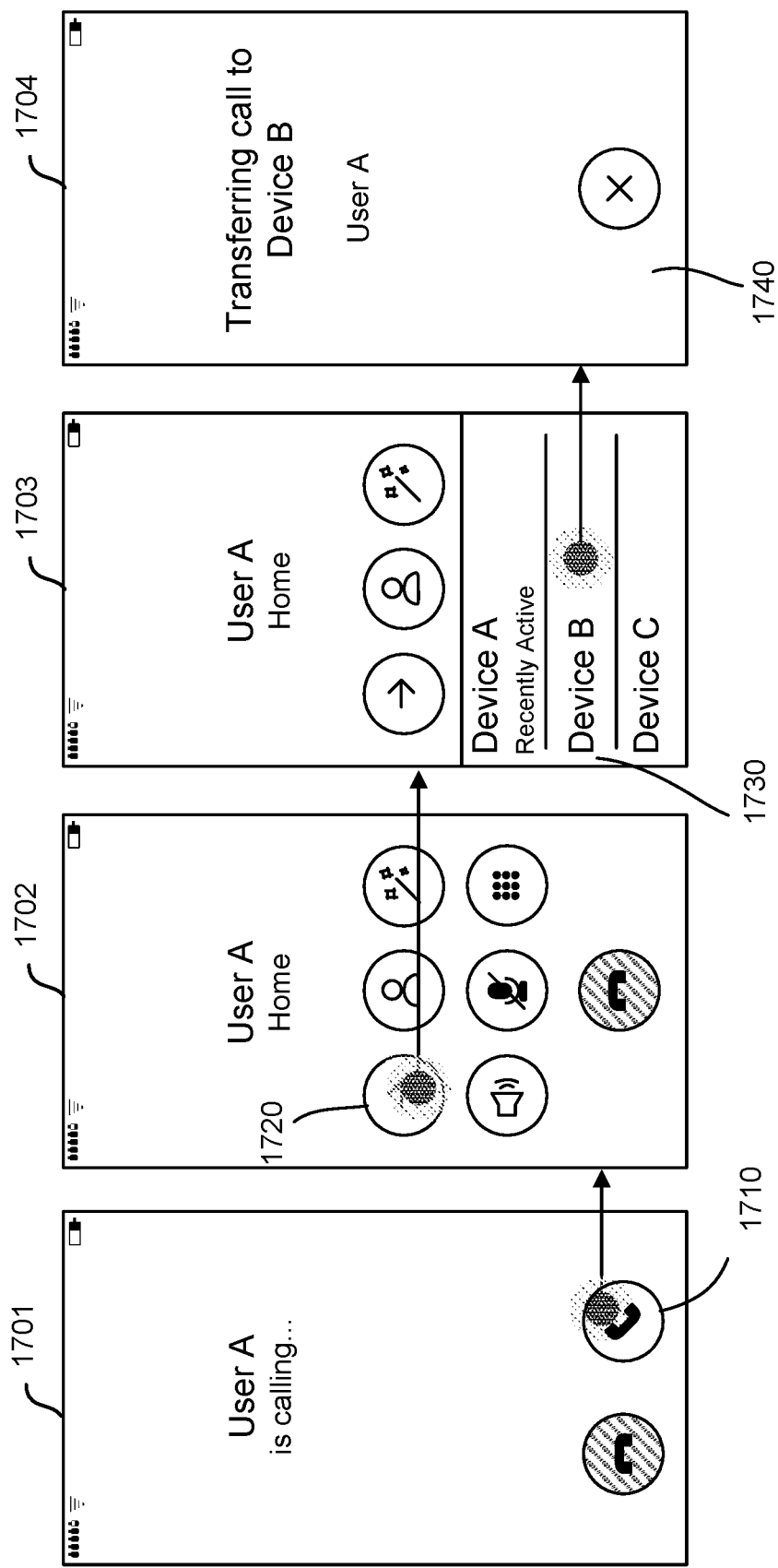
FIG. 17 illustrates an example graphical user interface (GUI) displaying information about a communications session transfer, according to certain embodiments of the present disclosure.

FIG. 17 illustrates an example graphical user GUI displaying information about a communications session transfer, according to certain embodiments of the present disclosure. In an example, a user operates a device that includes a GUI. Upon a call from an initiating device operated by a caller, the GUI presents an answer option 1710 to answer the call in a first screen 1701. Upon a selection of the option, a communications session is established between the two devices. Upon a determination that multiple devices are permitted for a transfer of the call, the GUI can present a transfer option 1720 in a second screen 1702. In response to a user selection of the transfer option 1720, the GUI presents a list 1730 of the permitted devices in a third screen 1703. The list can be prioritized based on a set of factors and can identify that one or more of the devices were recently active. Upon a user selection of one of the identified devices from the list 1730, the GUI presents information 1740 in a fourth screen 1704 indicating that the call is being transferred to the selected device.

Figure 18:
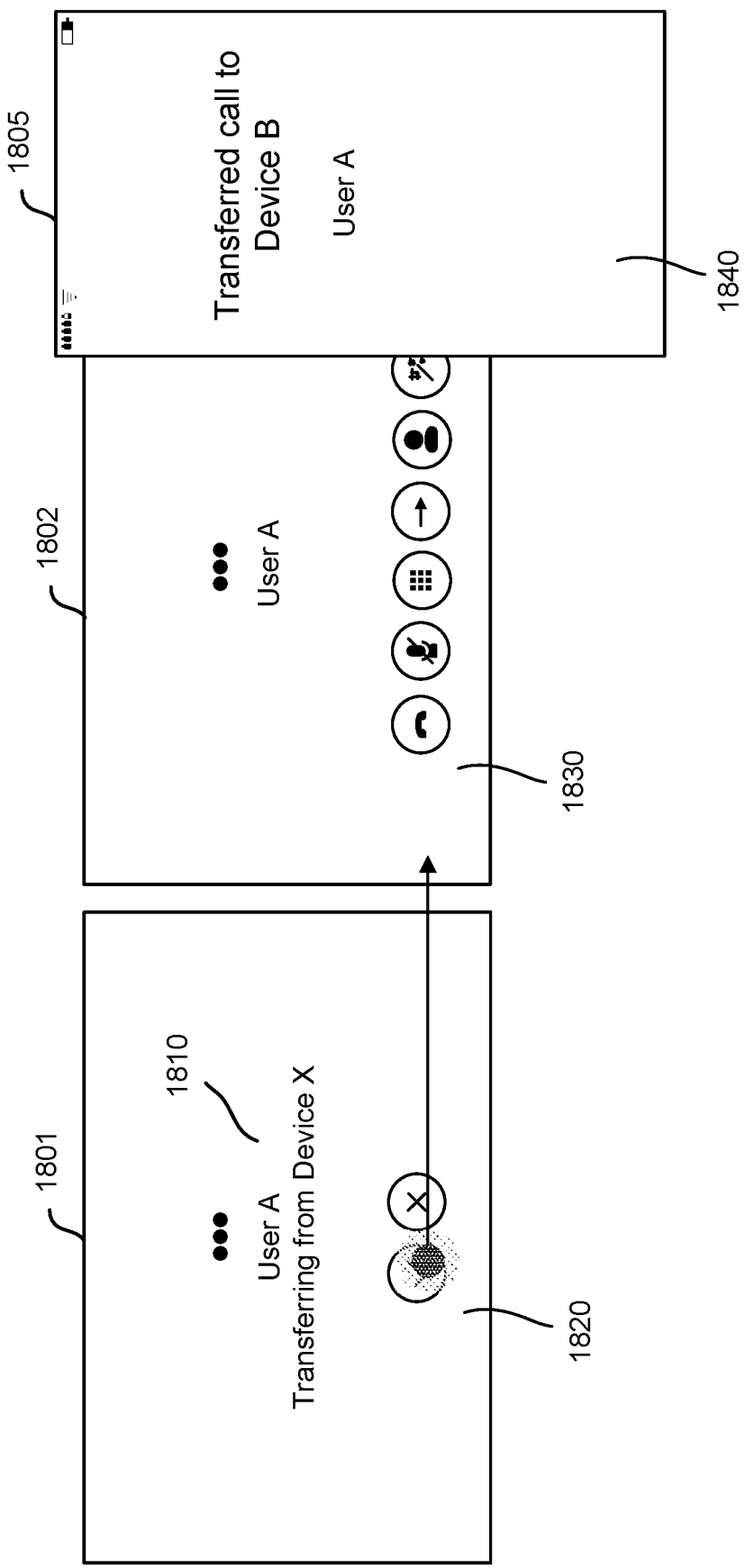
FIG. 18 illustrates example GUIs displaying information about a communications session transfer, according to certain embodiments of the present disclosure.

FIG. 18 illustrates example GUIs displaying information about a communications session transfer, according to certain embodiments of the present disclosure. In this example, a permitted device corresponds to the selected device described in connection with FIG. 17. In particular, a GUI of the permitted device presents information 1810 in a first screen 1801 identifying that the call with the caller is being transferred from the recipient device. The GUI also presents an answer option 1820 in the first screen 1801 to accept the transfer. Upon a user selection of the answer option 1820, the GUI present information 1830 in a second screen 1802 indicating that the call was transferred to the permitted device. In addition, the GUI of the recipient device presents information 1840 in a screen 1805 indicating that the call was transferred to the permitted device.

Figure 19:
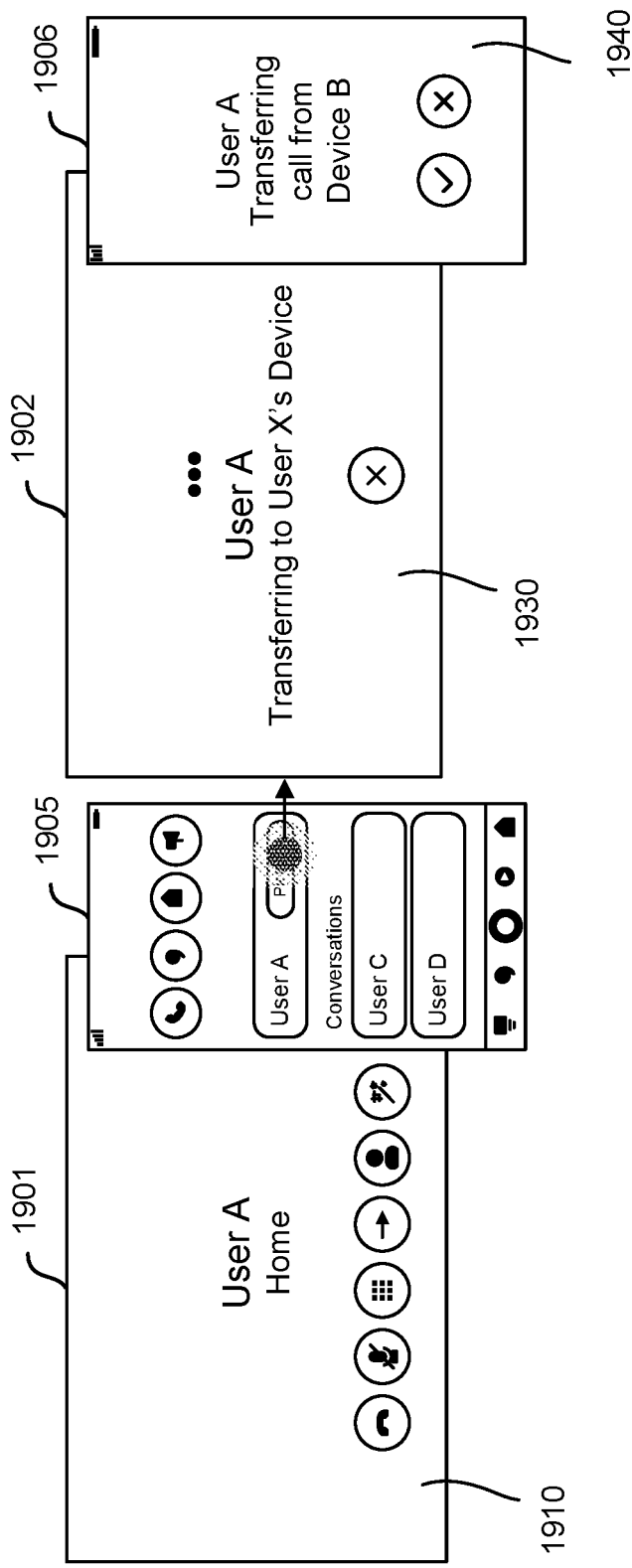
FIG. 19 illustrates example GUIs displaying information about a communications session pick up, according to certain embodiments of the present disclosure.

FIG. 19 illustrates example GUIs displaying information about a communications session pick up, according to certain embodiments of the present disclosure. In this example, a permitted device and a recipient device correspond to the permitted device and recipient device, respectively, described in connection with FIG. 18. In particular, the call was transferred from the recipient device to the permitted device. Now, the GUI of the recipient device (or any other device that can be determined as permitted) can be used to view the ongoing communications session and request a pick up as permitted.

As illustrated, the GUI of the permitted device presents information 1910 in a first screen 1901 indicating that the call has been transferred and is occurring via the permitted device. The GUI of the recipient device can present, in a first screen 1905, a list of ongoing data communications that can be transferred to the recipient device and a pick up option 1920 to select one of these data communications. Upon a user selection of the pick up option 1920, the GUI of the permitted device presents information 1930 in a second screen 1902 indicating that the call is being transferred to the recipient device. In addition, the GUI of the recipient device presents information 1940 in a second screen 1906 indicating that the call is being transferred from the permitted device and providing an answer option to accept the transfer.

Figure 20:
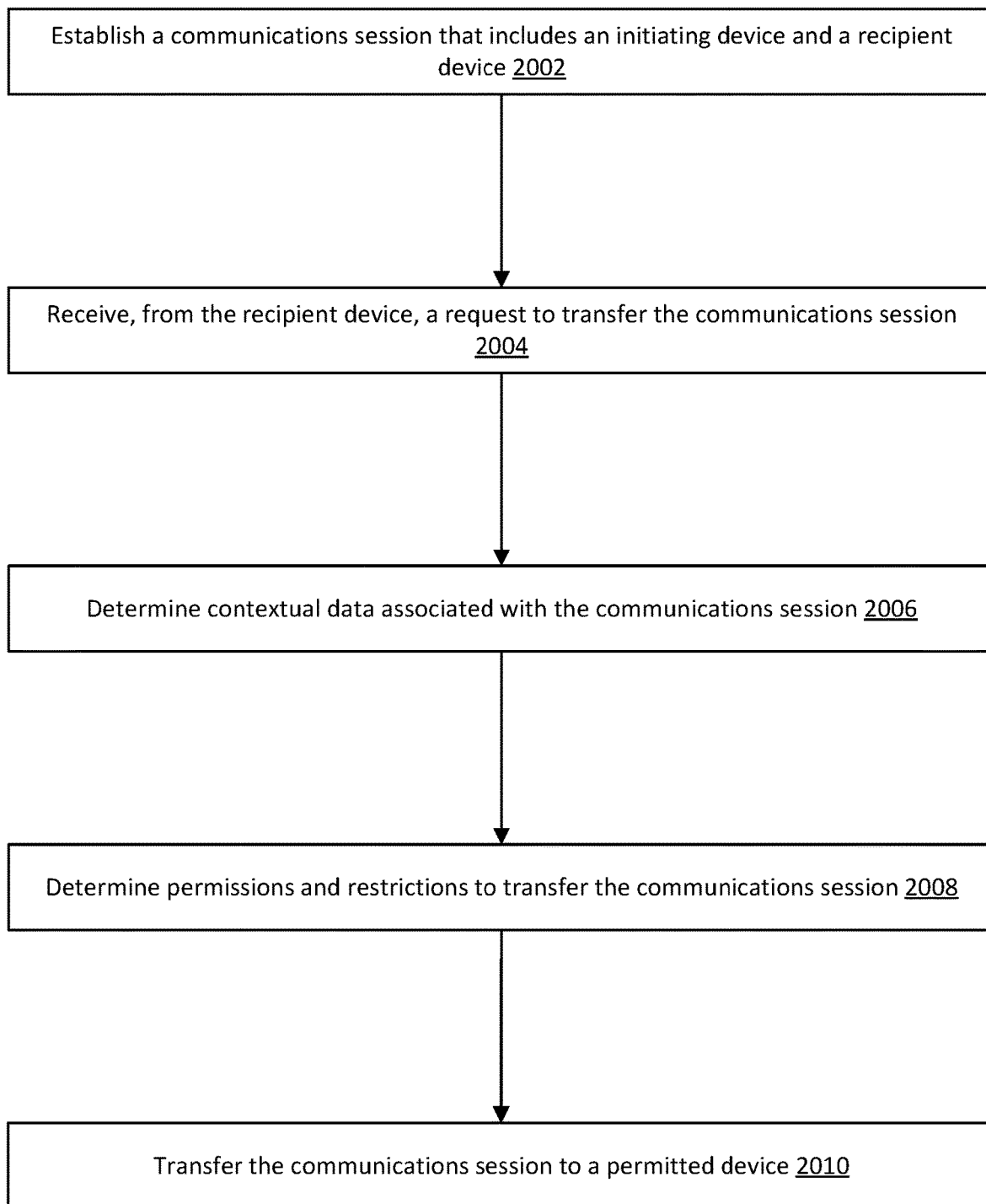
FIG. 20 illustrates an example flow for transferring a communications session based on an identifier, a location, and a list of permitted contacts, according to certain embodiments of the present disclosure.

FIG. 20 illustrates an example flow for transferring a communications session based on an identifier, a location, and a list of permitted contacts, according to certain embodiments of the present disclosure. In an example, the flow starts at operation 2002, where the computer system establishes a communications session between an initiating device and a recipient device.

At operation 2004, the computer system receives from the recipient device a request to transfer the communications session. The request can indicate be generic, specific to a target device, or indicate a space as illustrated in connection with FIGS. 10-12.

At operation 2006, the computer system determines contextual data associated with the communications session. In an example, the contextual data includes an identifier of an account (e.g., a user identifier associated with a user account or a group identifier associated with a group account) and a geolocation of the recipient device as illustrated in connection with FIGS. 6-7.

At operation 2008, the computer system determines permissions and restrictions to transfer the communications session based on the contextual data. In an example, the computer system determines one or more devices associated with the identifier, as illustrated in connection with FIGS. 10-12. Each of such devices is a candidate device for the communications session transfer. For each candidate device, the computer system determines whether the candidate device is configured to support one or more communications sessions transferred from the recipient device. Different examples are possible to perform this determination depending on the type of the contextual data that is available, as described herein above in connection with FIGS. 6-9. In an example, the geographic location of an IP address of the candidate device (or, as described in connection with FIG. 7, a network location). The computer system determines whether the geographic location is within a predefined geographic area that includes the recipient device as described in connection with FIG. 7 (or, as described in connection with FIG. 7, if the two devices are connected to a same computer network). If both devices are located within the geographic area (or, similarly, connected to a same computer network), the computer system determines that a permission exists for transferring the communications session to the candidate device. Otherwise, the computer system determines that a restriction exists on the transfer. Additionally or alternatively to geolocation data, the computer system can consider lists of permitted contacts. In particular, the computer system determines a list that is associated with a candidate device, as illustrated in connection with FIG. 8. The computer system also determines an identifier associated with the initiating device (e.g., a user identifier associated with the caller). The computer system determines whether a match exists between the identifier and the list. If a match exists, the computer system determines that a permission exists for transferring the communications session to the candidate device. Otherwise, the computer system determines that a restriction exists on the transfer.

At operation 2010, the computer system transfers the communications session to a permitted device (e.g., causes a transferred communications session to be established with the permitted device and the initiating device). If multiple permitted devices are identified, the computer system can request a user selection of one of the permitted devices or can automatically select one of the permitted devices, as illustrated in connection with FIG. 10.

Figure 21:
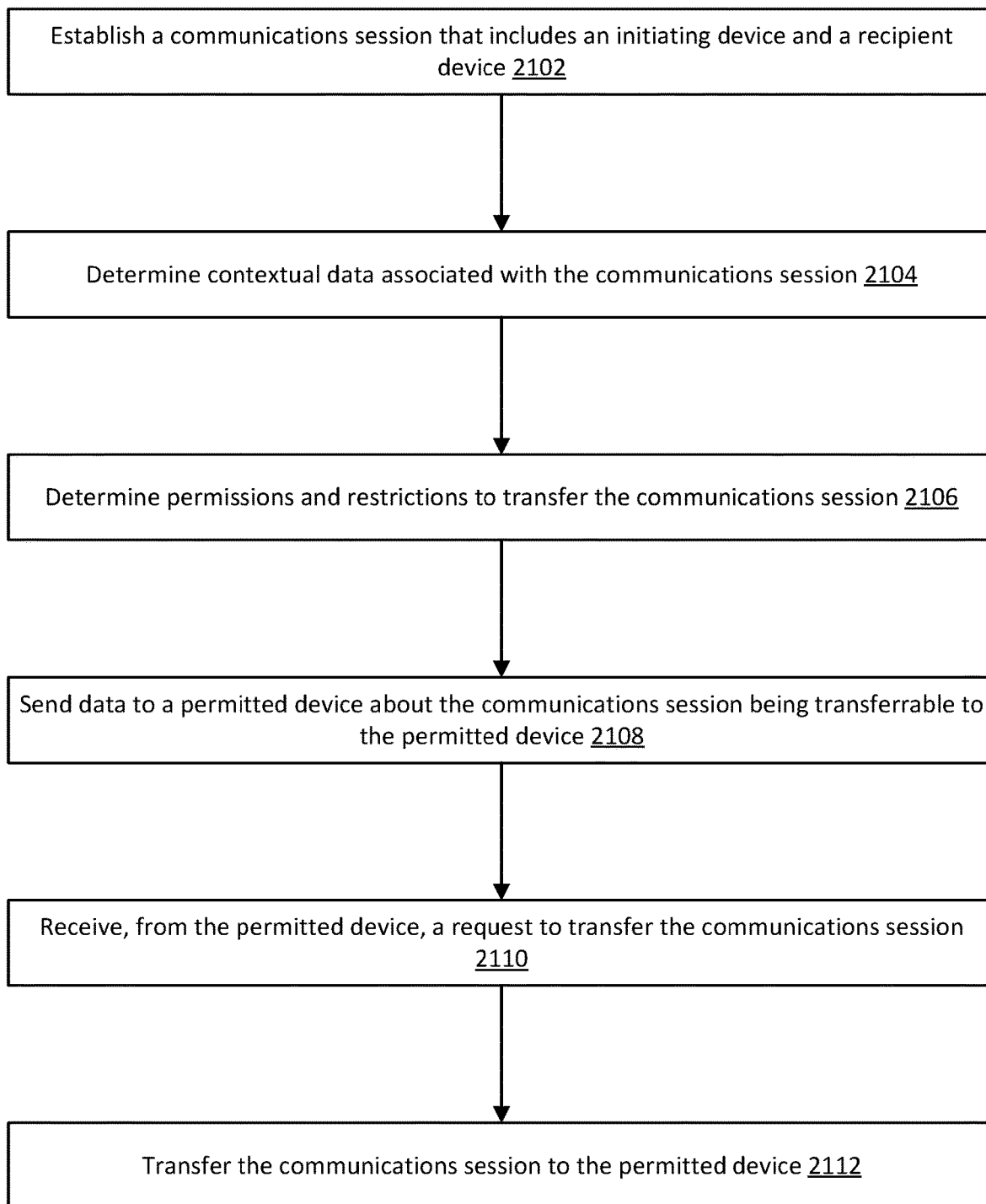
FIG. 21 illustrates example for transferring a communications session based on an address, a location, and a list of permitted contacts according to certain embodiments of the present disclosure.

FIG. 21 illustrates example for transferring a communications session based on an address, a location, and a list of permitted contacts according to certain embodiments of the present disclosure. In an example, the flow starts at operation 2102, where the computer system establishes a communications session between an initiating device and a recipient device. The communications session is established based on a request received from the initiating device.

At operation 2104, the computer system determines contextual data associated with the communications session. In an example, the contextual data includes an address for the communications session and a geolocation of the recipient device as illustrated in connection with FIGS. 5 and 7. The address can be specific to a user account or generic to a group account.

At operation 2106, the computer system determines permissions and restrictions to transfer the communications session based on the contextual data. In an example, the computer system determines one or more devices associated with the address, as illustrated in connection with FIGS. 14-15. Each of such devices is a candidate device for the communications session transfer. For each candidate device, the computer system determines the geographic location of an IP address of the candidate device (or, as described in connection with FIG. 7, a network location). The computer system determines whether the geographic location is within a predefined geographic area that includes the recipient device as described in connection with FIG. 7 (or, as described in connection with FIG. 7, if the two devices are connected to a same computer network). If both devices are located within the geographic area (or, similarly, connected to a same computer network), the computer system determines that a permission exists for transferring the communications session to the candidate device. Otherwise, the computer system determines that a restriction exists on the transfer. Additionally or alternatively to geolocation data, the computer system can consider contacts lists. In particular, the computer system determines a contacts list that is associated with the initiating device, as illustrated in connection with FIG. 9. The computer system also determines an identifier associated with the candidate device (e.g., a user identifier or a group identifier). The computer system determines whether a match exists between the identifier and the contacts list. If a match exists, the computer system determines that a permission exists for transferring the communications session to the candidate device. Otherwise, the computer system determines that a restriction exists on the transfer.

At operation 2108, the computer system sends data to a permitted device about the communications session being transferrable to the permitted device. The data can identify the identifier associated with the initiating device and/or the identifier associated with the recipient device and can cause the permitted device to present an option to request the transfer of the communications session to the permitted device.

At operation 2110, the computer system receives from the recipient device a request to transfer the communications session. At operation 2112, the computer system transfers the communications session to the permitted device.

Figure 22:
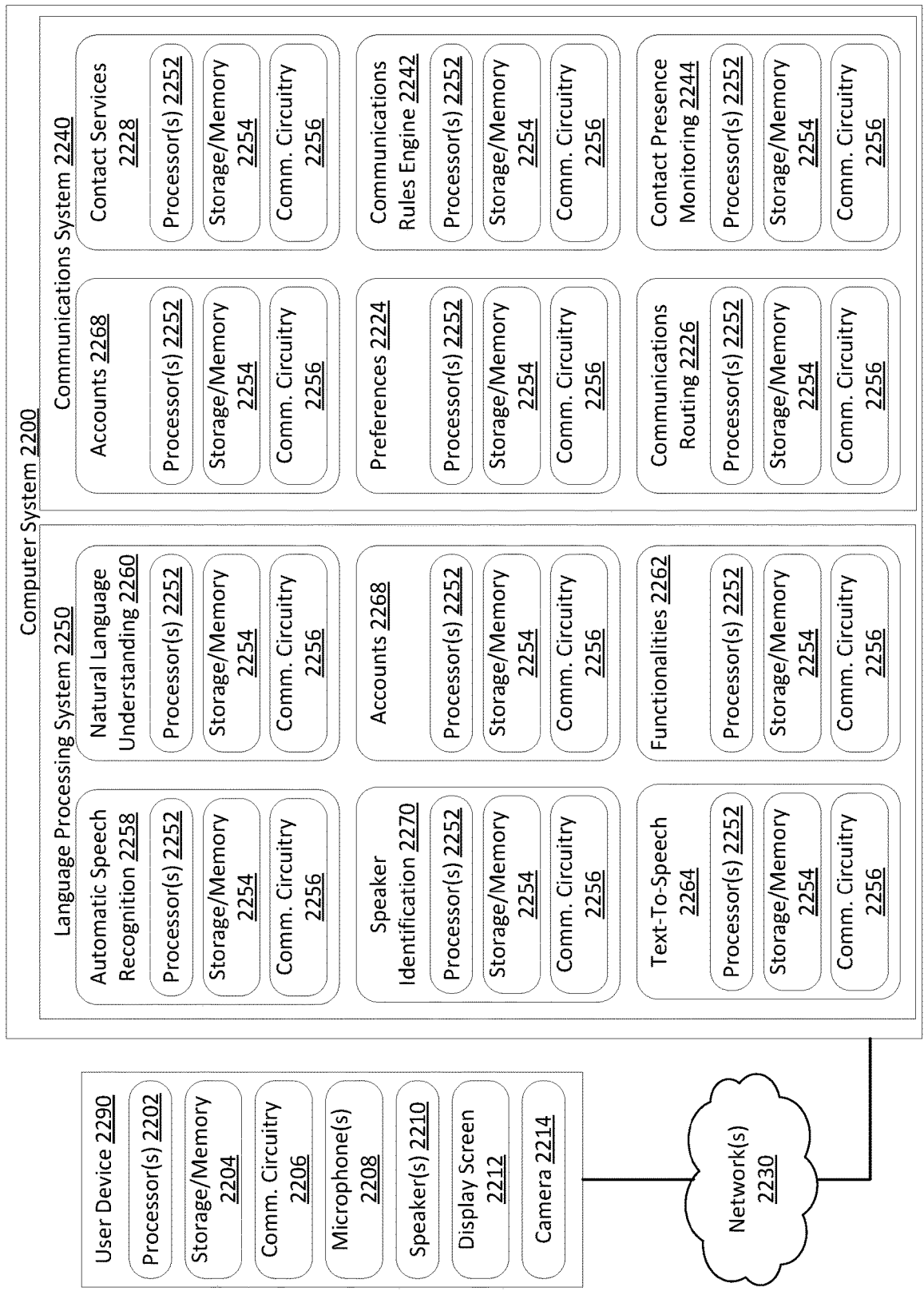
FIG. 22 illustrates an example system architecture of a computing device and a computer system, according to certain embodiments of the present disclosure.

FIG. 22 illustrates an example system architecture of a computing device and a computer system, according to certain embodiments of the present disclosure. As illustrated, a computing device 2290 may be configured to communicate with a computer system 2200, and in particular with a language processing system 2250, in response to detecting an utterance including a wakeword, which may subsequently be followed by a request/question/statement. Similarly, the computing device 2290 may alternatively or additionally include one or more manually activated components for manually activated capabilities. In this particular scenario, the computing device 2290 may also be configured, in some embodiments, to communicate with the language processing system 2250, in response to a manual input being detected by one or more input mechanisms, such as a touch screen, a button, and/or a switch, for example. The computer system 2200 is an example of the computer system 110 of FIG. 1 and the computer system 210 of FIG. 2. The computing device 2290 is usable to initiate and receive communications and is an example of the initiating device 120 of FIG. 1, the recipient device 130 of FIG. 1, the initiating device 220 of FIG. 2, and the recipient device 230 of FIG. 2.

In non-limiting embodiments, the computing device 2290 may be capable of being activated in response to detecting a specific sound, such as a wakeword. After detecting a specific sound (e.g., a wakeword or trigger expression), the computing device 2290 may recognize commands (e.g., audible commands, inputs) within captured audio, and may perform one or more actions in response to the received commands. Furthermore, the computing device 2290 may also be configured to perform one or more actions in response to detecting a particular touch, or mechanical, input(s) via the computing device 2290.

The computing device 2290 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices, personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), smart speakers, smart appliances, smart home monitoring system (e.g., a video security system) and/or smart accessories (e.g., light bulbs, light switches, electrical switches, etc.). In some embodiments, the computing device 2290 may be relatively simple or basic in structure such that no, or a minimal number of, mechanical input option(s) (e.g., keyboard, mouse, track pad) or touch input(s) (e.g., touch screen, buttons) are included. For example, the computing device 2290 may be able to receive and output audio, and may include power, processing capabilities, storage/memory capabilities, and communication capabilities. However, in other embodiments, the computing device 2290 may include one or more components for receiving mechanical inputs or touch inputs, such as a touch screen and/or one or more buttons.

The computing device 2290, in some embodiments, may include a minimal number of input mechanisms (e.g., a power on/off switch) such that functionality of the computing device 2290 may solely or primarily be through audio input and audio output. For example, the computing device 2290 may include, or be in communication with, one or more microphones that listen for a wakeword by continually monitoring local audio. In response to the wakeword being detected, the computing device 2290 may establish a connection with the language processing system 2250 (such as through a network(s) 2230), send audio data to the language processing system 2250, and await/receive a response from the language processing system 2250. In some embodiments, however, non-voice/sound activated devices may also communicate with the language processing system 2250 (e.g., push-to-talk devices). For example, in response to a button or touch screen being pressed, or a button or touch screen being pressed and held, a microphone associated with the computing device 2290 may begin recording local audio, establish a connection with the language processing system 2250, send audio data representing the captured audio to the language processing system 2250, and await/receive a response, and/or action to be occur, from the language processing system 2250.

It may be recognized that although in the illustrative embodiment shown in FIG. 22, the computer system 2200 includes the language processing system 2250, this is merely exemplary, and the language processing system 2250 may be separate from the computer system 2200. For example, the language processing system 2250 may be located within a dedicated computing device (such as one or more separate server(s), or within the computing device 2290) or computing system, which may or may not be in communication with the computer system 2200 and/or one or more additional devices.

The computing device 2290 may include one or more processors 2202, storage/memory 2204, communications circuitry 2206, one or more microphones 2208 or other audio input devices (e.g., transducers), one or more speakers 2210 or other audio output devices, a display screen 2212, and one or more cameras 2214 or other image capturing components. However, one or more additional components may be included within the computing device 2290, and/or one or more components may be omitted. For example, the computing device 2290 may also include a power supply or a bus connector. As still yet another example, the computing device 2290 may include one or more additional input and/or output mechanisms, such as one or more buttons, or one or more switches or knobs. Furthermore, while the computing device 2290 may include multiple instances of one or more components, for simplicity only one of each component has been shown.

In some embodiments, the computing device 2290 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, the computing device 2290 may be in communication with an additional processing device including one or more of: processor(s) 2202, storage/memory 2204, communications circuitry 2206, microphone(s) 2208, speaker(s) 2210, display screen 2212, and/or camera(s) 2214. For example, a centralized control device of the computing device 2290 may include one or more microphone(s) 2208. These microphone(s) 2208 may receive audio input signals, which in turn may be sent to the language processing system 2250 in response to a wakeword engine of the computing device 2290 determining that a wakeword was uttered.

The processor(s) 2202 may include any suitable processing circuitry capable of controlling operations and functionality of the computing device 2290, as well as facilitating communications between various components within the computing device 2290. In some embodiments, the processor(s) 2202 may include a central processing unit ("CPU"), a graphic processing unit ("GPU"), one or more microprocessors, a digital signal processor, or any other type of processor, or any combination thereof. In some embodiments, the functionality of the processor(s) 2202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 2202 may include its own local memory, which may store program systems, program data, and/or one or more operating systems. However, the processor(s) 2202 may run an operating system ("OS") for the computing device 2290, and/or one or more firmware applications, media applications, and/or applications resident thereon. In some embodiments, the processor(s) 2202 may run a local client script for reading and rendering content received from one or more websites. For example, the processor(s) 2202 may run a local JavaScript client for rendering HTML or XHTML content received from a particular URL accessed by the computing device 2290.

The storage/memory 2204 may include one or more types of storage mediums such as any volatile or non-volatile memory, or any removable or non-removable memory implemented in any suitable manner to store data for the computing device 2290. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory 2204 may be implemented as computer-readable storage media ("CRSM"), which may be any available physical media accessible by processor(s) 2202 to execute one or more instructions stored within the storage/memory 2204. In some embodiments, one or more applications (e.g., gaming, music, video, calendars, lists, etc.) may be run by the processor(s) 2202, and may be stored in the memory 2204.

In some embodiments, the storage/memory 2204 may include a media system, which may be configured to facilitate communications between the computing device 2290 and the computer system 2200. For example, the media system may store one or more communications protocols that may be executed by the processor(s) 2202 for facilitating communications for the computing device 2290. In some embodiments, a sessions initiation protocol ("SIP") may be used to facilitate media transfer between the computing device 2290 and one or more of the computer system and a second computing device 2290. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the computing device 2290. In some embodiments, a Web Real-Time Communications ("WebRTC") protocols may be employed by the computing device 2290. In a non-limiting embodiment, the media system may include instructions that indicate which communications protocols to employ for facilitating media transfer between devices based on a device type of the computing device 2290. For example, if the computing device 2290 does not include the display 2212 and/or camera 2214, the media system may indicate that PJSIP should be used, whereas if the computing device 2290 includes the display 2212 and/or camera 2214, the media system may indicate that WebRTC protocols should be used.

In some embodiments, the storage/memory 2204 may include one or more systems and/or databases, such as a speech recognition system, a wakeword database, a sound profile database, and a wakeword detection system. The speech recognition system may, for example, include an automatic speech recognition ("ASR") component 2258 that recognizes human speech in detected audio signals and converts the audio signals to text data. The speech recognition system may also include a natural language understanding ("NLU") component 2260 that determines user intent based on the text data it receives from ASR. Also included within the speech recognition system may be a text-to-speech ("TTS") component 2264 that is capable of converting text to speech to be outputted by the speaker(s) 2210 in the computing device 2290, and/or a speech-to-text ("STT") component capable of converting received audio signals into text to be sent to the language processing system 2250 for processing.

The wakeword database may be a database stored locally by the storage/memory 2204 of the computing device 2290, and may include a list of a current wakewords for the computing device 2290, as well as one or more previously used, or alternative, wakewords for the voice activated computing device 2290. In some embodiments, an individual may set or program a wakeword for their computing device 2290. The wakeword may be programmed directly on the computing device 2290, or a wakeword or wakewords may be set by the individual via a local client application that is in communication with computer system 2200 and/or language processing system 2250. For example, an individual may use their mobile device having the speech-processing system application running thereon to set the wakeword. The specific wakeword may then be communicated from the mobile device to the language processing system 2250, which in turn may send/notify the computing device 2290 of the individual's selection for the wakeword. The selected activation may then be stored in the wakeword database of the storage/memory 2204. In some embodiments, additional trigger expressions or permutations of the wakeword may also be stored within the storage/memory 2204. For example, specific trigger expressions or words that indicate the presence of the wakeword may also be stored within the storage/memory 2204. In some embodiments, audio watermarks, indicating a specific action or message, may also be stored within the storage/memory 2204.

In some embodiments, sound profiles for different words, phrases, commands, or audio compositions are also capable of being stored within the storage/memory 2204, such as within a sound profile database. For example, a sound profile of audio may be stored within the sound profile database of the storage/memory 2204 on the computing device 2290. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by the microphone(s) 2208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s) 2208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by the microphone(s) 2208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the computing device 2290 may then begin transmitting the audio signal to the language processing system 2250 for detecting and responds to subsequent utterances made by an individual.

In some embodiments, the storage/memory 2204 may store voice biometric data associated with one or more individuals. For example, an individual that operates the computing device 2290 may have a registered user account on the computer system 2200 (e.g., within accounts system 2268). In some embodiments, the computing device 2290 may be associated with a group account, and various individuals may have user accounts that are operating under the rules and configurations of the group account. As an illustrative example, an initiating computing device 2290 (e.g., the initiating device 120 of FIG. 1) may be associated with a first group account on the computer system 2200, the first group account being for a family that lives at a household where first shared electronic device is located. Each family member may also have a user account that is linked to the first group account (e.g., a parent, a child, etc.), and therefore each user account may obtain some or all of the rights of the first group account. For example, the computing device 2290 may have a first group account on the computer system 2200 registered to a particular family or group, and each of the parents and children of the family may have their own user account associated with the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, a voice print of that audio data may be generated using speaker identification functionality stored within the storage/memory 2204. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow computing device 2290 to attempt and identify a speaker of a particular utterance locally. However, persons of ordinary skill in the art will recognize that the computing device 2290 may not perform speaker identification processing, and alternatively speaker identification processing may be performed by the computer system 2200 (e.g., a speaker identification system 2270), or no speaker identification processing may be performed all together.

The communications circuitry 2206 may include any circuitry allowing or enabling one or more components of the computing device 2290 to communicate with one another, or with one or more additional devices, servers, and/or systems. For example, the communications circuitry 2206 may facilitate communications between the computing device 2290 and the computer system 2200. As an illustrative example, audio data representing an utterance may be transmitted over the network(s) 2230, such as the Internet, to the computer system 2200 using any number of communications protocols. For example, the network(s) 2230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the computing device 2290 and the computer system 2200. In some embodiments, the computing device 2290 and computer system 2200 and/or one or more additional devices or systems (e.g., the language processing system 2250) may communicate with one another via a web browser using HTTP. Various additional communication protocols may be used to facilitate communications between the computing device 2290 and computer system 2200, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 22GSM, DECT, IS-136/TDMA, iDen, LTE or any other suitable cellular network protocol), infrared, BitTorrent, FTP, RTP, RTSP, SSH, and/or VOIP.

The communications circuitry 2206 may use any communications protocol, such as any of the previously mentioned exemplary communications protocols. In some embodiments, the computing device 2290 may include an antenna to facilitate wireless communications with a network using various wireless technologies (e.g., Wi-Fi, Bluetooth, radiofrequency, etc.). In yet another embodiment, the computing device 2290 may include one or more universal serial bus ("USB") ports, one or more Ethernet or broadband ports, and/or any other type of hardwire access port so that the communications circuitry 2206 allows the computing device 2290 to communicate with one or more communications networks.

The computing device 2290 may also include one or more microphones 2208 and/or transducers. Furthermore, one or more microphones located within a separate device may be in communication with the computing device 2290 to capture sounds for the computing device 2290. The Microphone(s) 2208 may be any suitable component capable of detecting audio signals. For example, the microphone(s) 2208 may include one or more sensors for generating electrical signals and circuitry capable of processing the generated electrical signals. In some embodiments, the microphone(s) 2208 may include multiple microphones capable of detecting various frequency levels. As an illustrative example, the computing device 2290 may include multiple microphones (e.g., four, seven, ten, etc.) placed at various positions about the computing device 2290 to monitor/capture any audio outputted in the environment where the computing device 2290 is located. The various microphones 2208 may include some microphones optimized for distant sounds, while some microphones may be optimized for sounds occurring within a close range of the computing device 2290. In some embodiments, the microphone(s) 2208 may only begin to detect audio signals in response to a manual input to computing device 2290. For example, a manually activated device may begin to capture audio data using the microphone(s) 2208 in response to a user input, such as pressing a button, tapping a touch screen, or providing any touch input gesture to a touch input component.

The computing device 2290 may include one or more speakers 2210. Furthermore, the computing device 2290 may be in communication with one or more speaker(s) 2210. The speaker(s) 2210 may correspond to any suitable mechanism for outputting audio signals. For example, the speaker(s) 2210 may include one or more speaker units, speaker housings, transducers, arrays of speakers, and/or arrays of transducers that may be capable of broadcasting audio signals and or audio content to a surrounding area where computing device 2290 may be located. In some embodiments, the speaker(s) 2210 may include headphones or ear buds, which may be wirelessly wired, or hard-wired, to the computing device 2290, that may be capable of broadcasting audio directly to an individual.

In some embodiments, the one or more microphones 2208 may serve as input devices to receive audio inputs. The computing device 2290, in the previously mentioned embodiment, may then also include the one or more speakers 2210 to output audible responses. In this manner, the computing device 2290 may function solely through speech or audio, without the need for any input mechanisms or displays, however this is merely exemplary.

The display screen 2212 may correspond to a display device and/or touch screen, which may be any size and/or shape and may be located at any portion of the computing device 2290. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen 2212 may correspond to a projected capacitive touch ("PCT"), screen include one or more row traces and/or driving line traces, as well as one or more column traces and/or sensing lines. In some embodiments, the display screen 2212 may be an optional component for the computing device 2290. For instance, the computing device 2290 may not include the display screen 2212. Such devices, sometimes referred to as "headless" devices, may output audio, or may be in communication with a display device for outputting viewable content.

The display screen 2212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen 2212, a capacitance between the object and the conductive material may be formed. The processor(s) 2202 may be capable of determining a location of the touch screen associated with where the capacitance change is detected, and may register a touch input as occurring at that location.

In some embodiments, the display screen 2212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen 2212 corresponding to where a conductive object contacted display screen 2212.

A change in capacitance may be measured to determine a location on the touch screen where the object has contacted the surface. For example, if an individual touches a point on display screen 2212, then a corresponding driving line and sensing line that intersect at that point may be identified. A location of the point may have one or more pixels associated with that location, and therefore one or more actions may be registered for an item or items that are displayed at that location. The processor(s) 2202 of the computing device 2290 may be configured to determine which pixels are associated with a particular location point, and which item or items are also displayed at that pixel location. Furthermore, the computing device 2290 may be configured to cause one or more additional actions to occur to the item or items being displayed on the display screen 2212 based on a temporal duration the touch input, and or if one or more additional touch inputs are detected. For example, an object that contacted display screen 2212 at a first location may be determined, at a later point in time, to contact the display screen 2212 at a second location. In the illustrative example, an object may have initially contacted display screen 2212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 2212 having 100 driving lines and 100 sensing lines may have 100 intersection points, and therefore 100 individual capacitors, while a touch screen display screen 2212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the computing device 2290, and therefore the fewer driving lines and/or sensing lines used, the smaller the amount of power that is needed to operate the touch screen display.

In some embodiments, the display screen 2212 may correspond to a high-definition ("HD") display. For example, the display screen 2212 may display images and/or videos of 720p, 1080p, 1080i, or any other image resolution. In these particular scenarios, the display screen 2212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 22,073,600 pixels. However, persons of ordinary skill in the art will recognize that the aforementioned display ratios and pixel numbers are merely exemplary, and any suitable display resolution or pixel number may be employed for the display screen 2212, such as non-HD displays, 4K displays, and/or ultra-displays.

In some embodiments, the computing device 2290 may include one or more cameras 2214, corresponding to any suitable image capturing component or components capable of capturing one or more images and/or videos. The camera(s) 2214 may, in some embodiments, be configured to capture photographs, sequences of photographs, rapid shots (e.g., multiple photographs captured sequentially during a relatively small temporal duration), videos, or any other type of image, or any combination thereof. In some embodiments, the computing device 2290 may include multiple the cameras 2214, such as one or more front-facing cameras and/or one or more rear facing cameras. Furthermore, the camera(s) 2214 may be configured to recognize far-field imagery (e.g., objects located at a large distance away from the computing device 2290) or near-filed imagery (e.g., objected located at a relatively small distance from the computing device 2290). In some embodiments, the camera(s) may be high-definition ("HD") cameras, capable of obtaining images and/or videos at a substantially large resolution (e.g., 726p, 1080p, 1080i, etc.). In some embodiments, the camera(s) 2214 may be optional for the computing device 2290. For instance, the camera(s) 2214 may be external to, and in communication with, the computing device 2290. For example, an external camera may be capable of capturing images and/or video, which may then be provided to the computing device 2290 for viewing and/or processing.

Persons of ordinary skill in the art will recognize that, in some embodiments, the display screen 2212 and/or camera(s) 2214 may be optional for the computing device 2290. For instance, the computing device 2290 may function using audio inputs and outputting audio, and therefore the display screen 2212 and/or camera(s) 2214 may not be included. Furthermore, in some embodiments, the computing device 2290 may not include the display screen 2212 and/or camera(s) 2214, but instead may be in communication with the display screen 2212 and/or camera(s) 2214. For example, the computing device 2290 may be connected to a display screen via a Wi-Fi (e.g., 802.11 protocol) connection such that visual content sent to the computing device 2290 may be sent to the display screen, and output thereby.

In some exemplary embodiments, the computing device 2290 may include an additional input/output ("I/O") interface. For example, the computing device 2290 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the computing device 2290 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the computing device 2290. For example, one or more LED lights may be included on the computing device 2290 such that, when the microphone(s) 2208 receive audio, the one or more LED lights become illuminated signifying that audio has been received by the computing device 2290. In some embodiments, one or more vibrating mechanisms or other haptic features may be included with the computing device 2290 to provide a haptic response to an individual.

In some embodiments, the computing device 2290 may include radio-frequency identification ("RFID") functionality and/or near field communication ("NFC") functionality. Furthermore, in some embodiments, the computing device 2290 may include one or more infrared ("IR") sensors and one or more IR emitters. The IR sensors/emitters may be used to determine depth information. For example, in one embodiment, a distance of an individual from the computing device 2290 may be determined using the one or more IR sensors/emitters. Depth determination may be performed using any depth determination technique. In some embodiments, a distance between an individual and the computing device 2290 may be employed as a basis for presenting content with varying density using the display screen 2212. For example, when an individual is at a distance A from the computing device 2290, the computing device 2290 may display weather data for a current day. However as the user moves closer to the computing device 2290, such as at a distance B from the computing device 2290, which may be less than distance A, the computing device 2290 may display weather data for a current week. For instance, as the individual gets closer to the computing device 2290, the ability of the individual to see denser content increases, and as the individual moves father away from the computing device 2290, the individual's ability to see denser content decreases. This, for example, may ensure that the content displayed by the computing device 2290 is continually relevant and readable by the individual.

The computer system 2200, in non-limiting, exemplary embodiments, may include the language processing system 2250. The language processing system 2200 is an example of the language processing system 112 of FIG. 1. However, in other embodiments, the language processing system 2250 may be separate from, or in communication with, the computer system 2200. Generally, the language processing system 2250 may, in some embodiments, include one or more remote devices capable of receiving and sending content from/to one or more electronic device, such as the computing device 2290. The language processing system 2250 may include various components and systems including, but not limited to, automatic speech recognition ("ASR") system 2258, natural language understanding ("NLU") system 2260, functionalities system 2262, text-to-speech ("TTS") system 2264, and accounts system 2268. In some embodiments, language processing system 2250 may also include computer readable media, including, but not limited to, flash memory, random access memory ("RAM"), and/or read-only memory ("ROM"). The language processing system 2250 may also include various systems that store software, hardware, logic, instructions, and/or commands for the language processing system 2250, such as a speaker identification ("ID") system 2270, or any other system, or any combination thereof.

The ASR system 2258 may be configured to recognize human speech in audio signals received from the computing device 2290, such as audio captured by the microphone(s) 2208, which may then be transmitted to the language processing system 2250. The ASR system 2258 may include, in some embodiments, one or more processor(s) 2252, storage/memory 2254, and communications circuitry 2256. The processor(s) 2252, storage/memory 2254, and communications circuitry 2256 may, in some embodiments, be substantially similar to the processor(s) 2202, storage/memory 2204, and communications circuitry 2206, which are described in greater detail above, and the aforementioned descriptions may apply. In some embodiments, the ASR system 2258 may include speech-to-text ("STT") system 2264. The STT system 2264 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 2258 may include an expression detector that analyzes audio signals received by the language processing system 2250, such as the expression detector mentioned above with regards to the computing device 2290. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

The NLU system 2260 may be configured such that it determines user intent based on the text data is receives from the ASR system 2258. For example, the NLU system 2260 may determine that the intent of utterance is for initiating a communications session with a device, associated with a particular name (e.g., initiate a communications session with "Alice"). In response to determining the intent of the utterance, the NLU system 2260 may communicate the received command to an appropriate subject matter server or skill on the functionalities system 2262 to perform one or more tasks, and/or retrieve an appropriate response or response information. The NLU system 2260 may include processor(s) 2252, storage/memory 2254, and communications circuitry 2256 which, in one embodiment, may be substantially similar to the processor(s) 2202, storage/memory 2204, and communications circuitry 2206 of the computing device 2290, and the previous description may apply.

The functionalities system 2262 (also referred to as speechlets module 2262) may, for example, correspond to various action specific systems or servers, sometimes referred to as "skills," capable of processing various task specific actions. The functionalities system 2262 may further correspond to first party applications and/or third party applications capable of performing various tasks or actions. For example, based on the context of the audio data received from the computing device 2290, the language processing system 2250 may use a certain functionality to generate a response, or to obtain response information, which in turn may be communicated back to the computing device 2290. For instance, an utterance may ask for weather information, and therefore the functionalities system 2262 may access a weather application to obtain current weather information for a location associated with the computing device 2290. The functionalities system 2262 may also include processor(s) 2252, storage/memory 2254, and communications circuitry 2256.

The TTS system 2264 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 2264 may also include processor(s) 2252, storage/memory 2254, and communications circuitry 2256.

The accounts system 2268 may store one or more user accounts corresponding to users having a registered account on the computer system 2200. For example, a parent may have a registered account on the computer system 2200, and each of the parent's children may have their own user account registered under the parent's registered account. The accounts system 2268 may also store one or more group accounts corresponding to one or more shared devices. For example, a shared device, such as shared the computing device 2290, may have its own group account stored on the accounts system 2268. The group account may be associated with the shared device, and may also be linked to one or more individual's user accounts. For example, the shared computing device 2290 may be associated with a first group account corresponding to a first grouping of individual (e.g., a family). One or more user accounts may also be associated with the first group account (e.g., individual members of the family), corresponding to individuals that may be capable of interacting with the shared computing device 2290. Information, permissions (e.g., for Drop Ins), settings, and/or preferences, for example, for each user account may be stored within a user account database. In some embodiments, the accounts system 2268 may store a voice signal, such as voice biometric information, for a specific user account. This may allow speaker identification techniques to be used to match a voice-to-voice biometric data associated with a specific user account. In some embodiments, the accounts system 2268 may store a telephone number assigned to a particular user account, a device identifier associated with a particular device, a communications identifier associated with a particular user account and/or group account, or any other suitable information, or any combination thereof.

It should also be recognized that although each of the ASR system 2258, NLU system 2260, subject matter/skills system 2262, TTS system 2264, and accounts system 2268 may each include instances of the processor(s) 2252, storage/memory 2254, and communications circuitry 2256, and those instances of processor(s) 2252, storage/memory 2254, and communications circuitry 2256 within each of the ASR system 2258, NLU system 2260, functionalities system 2262, TTS system 2264, and accounts system 2268 may differ. For example, the structure, functionality, and style of the processor(s) 2252 within ASR system 2258 may be substantially similar to the structure, functionality, and style of the processor(s) 2252 within NLU system 2260, however the actual processor(s) 2252 need not be the same entity.

The computer system 2200 may also include, in a non-limiting embodiment, a communications system 2240, which may be configured to facilitate communications between two or more computing devices 2290. The communications system 1450 is an example of the communications system 111 of FIG. 1. For example, the communications system 2240 may be capable of facilitating a communications session between an initiating computing device and a recipient computing device and may include one or more calling agents and gateways nodes for communications session over PSTV or other types of communications network systems. Upon the language processing system 2250 determining that an intent of an utterance is for a communications session to be established between the computing device 2290 and another device, the computing device 2290 may access the communications system 2240 to facilitate the communications session. For example, the communications system 2240 may employ VoIP functionality to facilitate audio, video, and/or text data communications between the initiating computing device and the recipient computing device.

As an illustrative example, a communications session between two devices is described below to illustrate how the communications session may be established. In one example embodiment, an individual (e.g., a caller) may speak an utterance (e.g., "Alexa, send a message to Alice: 'Want to have dinner at my place?'") to their computing device 2290 (e.g., the initiating computing device 210). In response to detecting the device's wakeword (e.g., "Alexa"), the computing device 2290 may begin sending audio data representing the utterance to the computer system 2200, and in particular to the language processing system 2250. Upon receipt, the ASR system 2258 may perform speech recognition processing, such as speech-to-text processing, to the audio data to generate text data representing the audio data. The text data may then be passed to the NLU system 2260 to determine the intent of the utterance. For example, the NLU system 2260 may include a listing of sample utterances to be used to disambiguate the spoken words and determine an action intended to occur for the utterance. In some embodiments, a messaging speechlet system may be included within the NLU system 2260 that includes one or more sample utterance frameworks. If the format of the spoken utterance substantially matches one of these sample utterances, then that may indicate that the intent of the utterance was for a communications session to be initiated. For instance, one sample utterance may be "{Wakeword}, send a message to {Contact Name}: {Message}." If the framework of the spoken utterance's text data substantially matches this sample utterance framework, the NLU system 2260 may determine that the intent of the utterance was to start a communications session with a contact of the user, and NLU may also determine that the intended target of the communications session is "Alice" (e.g., {Contact Name}: Alice). After determining that a message is to be sent to a contact named "Alice," the communications system 2240 may rely on a contact services system 2228 that accesses the accounts system 2268 determines whether any device identifiers (e.g., a device address) are associated with the contact, "Alice." If multiple devices are determined, the communications system 2240 may access a preferences system 2224 that stores preferences of the contact for using the different devices and a contact presence monitoring system 2244 that detects the presence of the contact relative to these devices and provides proximity information. The communications system 2240 identifies a particular device or a particular subset of the devices that communications with which the communications can be initiated. Similarly, if an inbound communications request is associated with a user account that stores multiple device identifiers, a subset or all of the computing devices can be rung.

In some embodiments, the communications system 2240 may establish a communications session between an initiating device 2290 and a recipient device 2290 using one or more VoIP protocols including, but not limited to SIP, RTP, RTCP, SRTP, and SDP or other communication protocols implemented by a communications routing service 2226. In one illustrative embodiment, a SIP signaling command may be provided to the communications system 2240 for communicating with the recipient device. In particular, PJSIP functionality adds a new "user-to-user" header that indicates the device pair for the communications session.

In some embodiments, the communications system 2240 may include a communication rules engine 2242 that may store various rules for how certain communications between group accounts and user accounts are to behave and that may store device information for different computing devices. For example, the communications rules engine 2242 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. Other parameters relate to the device information, such as device type identifier, software version, and status. In some illustrative embodiments, the communication rules engine 2242 may store a communications table indicating various device identifiers, group account identifiers, communication identifiers, and device types for various devices interacting with the communications system. In addition, the communication rules engine 2242 may generate content, such as TTS audio, based on an identifier of the computing device 2290, where this content can identify a party initiating a communications session (e.g., the caller and/or the computing device 2290).

In some embodiments, the communications system 2240 may also include a message data store that may correspond to any suitable type of storage/memory, such as that of the storage/memory 2204, 2254, that is capable of storing one or more messages sent/received, including the content about the initiating party. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system 2240 may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 2268. This way, when an individual requests to receive messages associated with their group account, the message data store may be accessed to obtain any messages currently stored thereby that are associated with that group account's group account identifier.

The computer system 2200 may also include, in some embodiments, a speaker identification system 2270 that may correspond to any suitable device/system capable of identifying a particular person's voice from an audio signal. The speaker identification system 2270 may determine whether a current voice being used to speak matches known voice biometric data associated with a particular individual's voice. In some embodiments, voice biometric data may be stored within the accounts system 2268 for various individuals having a user account stored thereby. For example, the caller may have a user account on the computer system 2200 (e.g., stored within the accounts system 2268), which may be associated with the initiating device 210. Stored within that user account may be voice biometric data associated with a voice profile for the caller. Therefore, when an utterance is detected, and subsequently when audio data representing that utterance is received by the computer system 2200, the speaker identification system 2270 may determine whether the voice that spoke utterance matches, to at least a predefined confidence level, the stored voice biometric information associated with the caller stored by their user account. If so, then this may indicate that the caller is the likely speaker of the utterance.

The communications rules engine 2242 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system 2270 as to whether or not a speaker that spoke the utterance was identified. Using these two parameters, for instance, the communications rules engine 2242 may be configured to cause the communications system 2240 to facilitate communications between two or more devices.

In various embodiments of the present disclosure, a user has control over user-related information that can be collected and analyzed. Depending on the type of user-related information, appropriate measures are taken to ensure protection of this information, to empower the users to determine what data can be collected and analyzed, as well as empower the users to indicate which portions of the information should be deleted and/or no longer collected and/or analyzed. Further, the user has control over opting in to the communications services described herein and, if opted in, to opt out at any time. The features provided by the communication services are compliant with the applicable regulations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
one or more processors; and
one or more memories storing computer-readable instructions that, upon execution by the one or more processors, cause the computer system to:
cause first audio data to be output by a first device associated with a user profile, the output of the first audio data resulting in first audio;
determine contextual data associated with the first device;
determine second audio data is to be output by a second device associated with the user profile;
based at least in part on the contextual data, select the second device, rather than the first device, for audio output with regard to the user profile;
cause the first audio to cease;
cause the second device to output second audio data resulting in second audio;
determine the first device is connected to a third device, wherein a first connection between the first device and the third device results in the first audio and wherein the first connection involves at least one first wireless communication;
discontinue the first connection between the first device and the third device; and
cause a second connection between the second device and the third device, wherein the second connection results in the second audio and wherein the second connection involves at least one second wireless communication.

2. The computer system of claim 1, wherein one or more memories store further computer-readable instructions that, upon execution by the one or more processors, further cause the computer system to:
determine the contextual data includes data indicating permission to allow the second device to connect to the third device.

3. The computer system of claim 1, wherein one or more memories store further computer-readable instructions that, upon execution by the one or more processors, further cause the computer system to:
determine the second connection has failed; and
cause a third connection to be established between the first device and the third device.

4. The computer system of claim 1, wherein one or more memories store further computer-readable instructions that, upon execution by the one or more processors, further cause the computer system to:
determine that the second device is to be selected for audio output with regard to the user profile based at least in part on the first device and the second device being within a same area.

5. The computer system of claim 1, wherein one or more memories store further computer-readable instructions that, upon execution by the one or more processors, further cause the computer system to:
determine a command to switch from the first device to the second device for audio output with regard to the user profile.

6. The computer system of claim 1, wherein one or more memories store further computer-readable instructions that, upon execution by the one or more processors, further cause the computer system to:
cause the second device to output a notification regarding the second device being selected for audio output.

7. The computer system of claim 6, wherein the computer-readable instructions that cause the second device to output the notification comprise computer-readable instructions that, upon execution by the one or more processors, further cause the computer system to:
cause the second device to display the notification as part of a graphical user interface.

8. The computer system of claim 1, wherein the second audio data corresponds to a first communication session.

9. The computer system of claim 1, wherein the first audio data and the second audio data correspond to a first communication session.

10. A computer-implemented method, comprising:
causing first audio data to be output by a first device associated with a user profile, the output of the first audio data resulting in first audio;
determining contextual data associated with the first device;
determining second audio data is to be output by a second device associated with the user profile;
based at least in part on the contextual data, selecting the second device, rather than the first device, for audio output with regard to the user profile;
causing the first audio to cease;
causing the second device to output second audio data resulting in second audio;
determining the first device is connected to a third device, wherein a first connection between the first device and the third device results in the first audio and wherein the first connection involves at least one first wireless communication;
discontinuing the first connection between the first device and the third device; and
causing a second connection between the second device and the third device, wherein the second connection results in the second audio and wherein the second connection involves at least one second wireless communication.

11. The computer-implemented method of claim 10, further comprising:
determining the contextual data includes data indicating permission to allow the second device to connect to the third device.

12. The computer-implemented method of claim 10, further comprising:
determining the second connection has failed; and
causing a third connection to be established between the first device and the third device.

13. The computer-implemented method of claim 10, further comprising:
determining that the second device is to be selected for audio output with regard to the user profile based at least in part on the first device and the second device being within a same area.

14. The computer-implemented method of claim 10, further comprising:
determining a command to switch from the first device to the second device for audio output with regard to the user profile.

15. The computer-implemented method of claim 10, further comprising:
causing the second device to output a notification regarding the second device being selected for audio output.

16. The computer-implemented method of claim 15, wherein causing the second device to output a notification comprises:

causing the second device to display the notification as part of a graphical user interface.

17. The computer-implemented method of claim 10, wherein the second audio data corresponds to a first communication session.

18. The computer-implemented method of claim 10, wherein the first audio data and the second audio data correspond to a first communication session.

* * * * *